United States Patent
Yerazunis et al.

(10) Patent No.: US 11,104,008 B2
(45) Date of Patent: Aug. 31, 2021

(54) DEXTEROUS GRIPPER FOR ROBOTIC END-EFFECTOR APPLICATIONS

(71) Applicant: Mitsubishi Electric Research Laboratories, Inc., Cambridge, MA (US)

(72) Inventors: William Yerazunis, Acton, MA (US); Parthasarathi Ainampudi, Austin, TX (US); Nakul Gopalan, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 222 days.

(21) Appl. No.: 16/366,192

(22) Filed: Mar. 27, 2019

(65) Prior Publication Data

US 2020/0306995 A1    Oct. 1, 2020

(51) Int. Cl.
*B25J 15/02* (2006.01)

(52) U.S. Cl.
CPC ....... *B25J 15/0233* (2013.01); *B25J 15/0266* (2013.01)

(58) Field of Classification Search
CPC ............... B25J 15/0233; B25J 15/0286; B25J 15/0004; B25J 9/104; B25J 9/1692; B25J 13/085; B25J 15/0266; Y10S 901/32
USPC ......................................................... 294/111
See application file for complete search history.

(56) References Cited

U.S. PATENT DOCUMENTS

| | | | | |
|---|---|---|---|---|
| 4,483,326 A | * | 11/1984 | Yamaka | A61B 1/0057 600/141 |
| 4,865,376 A | * | 9/1989 | Leaver | B25J 9/1045 294/111 |
| 4,921,293 A | * | 5/1990 | Ruoff | B25J 9/1045 294/111 |
| 5,200,679 A | * | 4/1993 | Graham | B25J 15/0009 294/111 |
| 5,447,403 A | * | 9/1995 | Engler, Jr. | B25J 15/0009 294/111 |
| 7,296,835 B2 | * | 11/2007 | Blackwell | B25J 9/104 294/106 |
| 8,419,096 B2 | * | 4/2013 | Kim | B25J 15/0009 294/111 |
| 8,424,941 B2 | * | 4/2013 | Ihrke | B25J 15/0009 294/106 |

(Continued)

*Primary Examiner* — Dean J Kramer
(74) *Attorney, Agent, or Firm* — Gene Vinokur; Hironori Tsukamoto

(57) ABSTRACT

A robot gripper includes two fingers of a grasper assembly configured to perform grasping motions via actuation of independent cable ends of a plurality of cables, and configured to move toward or away from each other to perform the grasping motion. Wherein each gripper finger is actuated by a pair of cables, a cable of the pair slides in a flexible sheath when actuated by a motor, moving the gripper finger in an opposite direction of another cable of the pair also in a flexible sheath, providing equal motions of each cable in the pair in opposite directions. A motor assembly including the motors is mounted at a location separate from the grasper assembly with the flexible sheathing extending between the assemblies. Such that the separate assembly mounting arrangement provides an improved ratio between a gripping force of the grippers versus the robot-lifted mass of the grasper assembly.

18 Claims, 19 Drawing Sheets

(56) References Cited

U.S. PATENT DOCUMENTS

| | | | |
|---|---|---|---|
| 8,491,603 B2 * | 7/2013 | Yeung | A61B 34/30 606/130 |
| 8,936,290 B1 * | 1/2015 | Salisbury | B25J 19/065 294/111 |
| 9,505,132 B1 * | 11/2016 | Bingham | B25J 9/1692 |
| 10,238,271 B2 * | 3/2019 | Haraguchi | A61B 1/00045 |

* cited by examiner

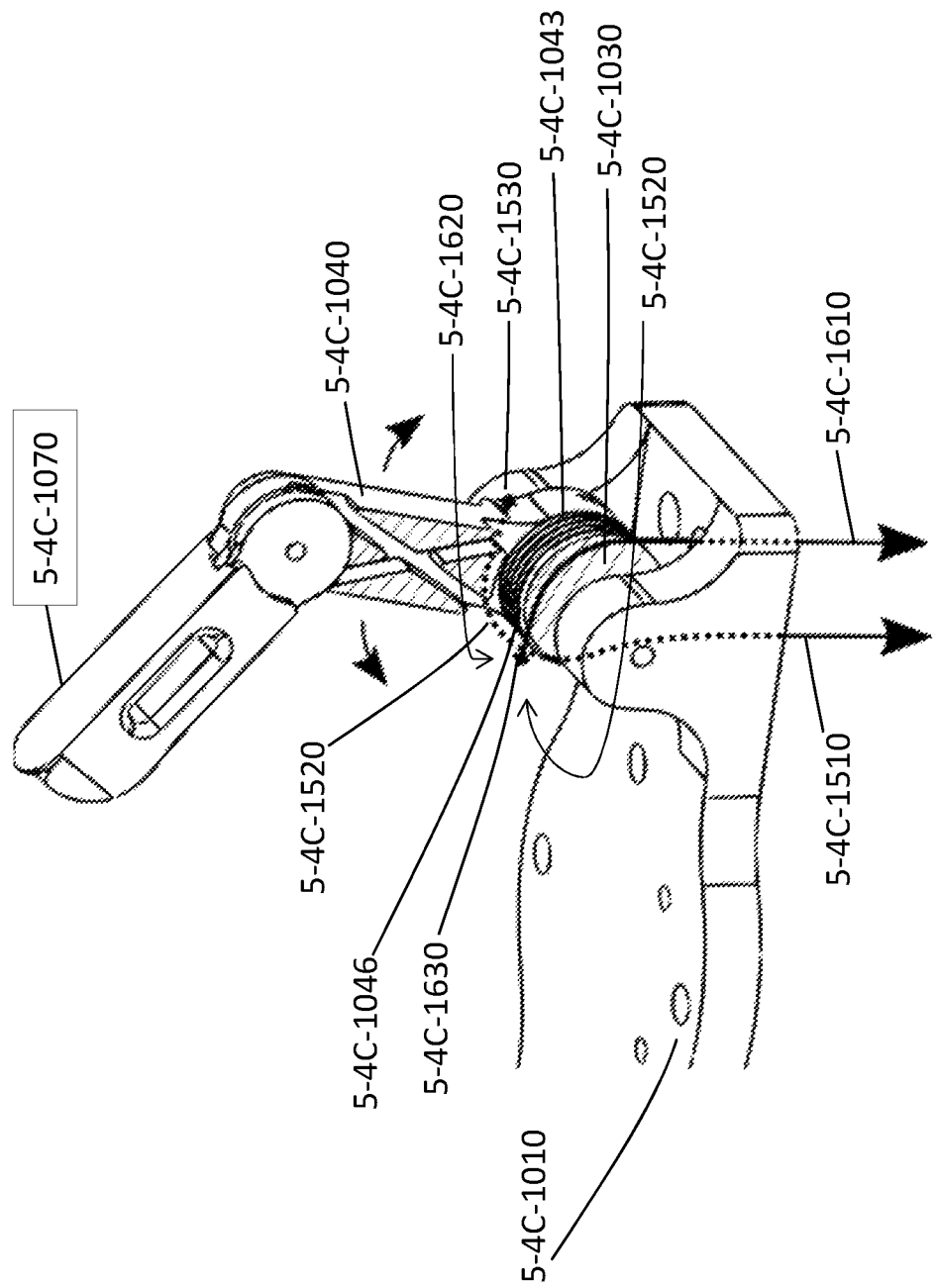

DEXTEROUS GRIPPER FOR ROBOTIC END-EFFECTOR APPLICATIONS

FIELD

The present invention relates generally to robot manipulators, and more particularly robot manipulators having grippers or robotic end effectors.

BACKGROUND

Conventional robotic grippers and/or endpoint effectors can be categorized as pneumatic grippers, hydraulic grippers, electromagnetic motor grippers and suction and vacuum grippers. Each conventional gripper presents some benefits and many problems. For example, some of the problems conventional grippers include being too heavy in overall weight and design, weak in terms of durability and longtime operational wear and tear, slow gripping performance in terms of time the grippers clasp an object and are limited in controllability or in some cases uncontrollable for truly dexterous manipulation.

For example, conventional pneumatic grippers, these devices include a pneumatic cylinder (usually double acting, sometimes spring-loaded) slides or pivots a pair of fingers together (for pinch and encircle grips) or apart (for interior or "spread") grips. However, there is no proportional control, the gripper is either CLOSED or OPEN. The pneumatic grippers require compressed air, provide strong gripping forces (~100-1000 Nt) that is available for gripping. However, some problems with the conventional pneumatic grippers include that they are very heavy in overall weight, during operation there is no feedback to the user regarding any sort of true dexterous manipulation. Other problems the conventional pneumatic grippers have are that they are very noisy. The typical applications are associated with and are suitable only for "uncrushable" objects, which severely restricts application uses to certain industries.

Regarding conventional hydraulic grippers, these devices include a hydraulic cylinder that slides or pivots the fingers together and apart. Some aspects of the conventional hydraulic grippers include a strong gripping force (10,000 Nt and up) powerful to bend and clamp thin steel sheets such as auto body panels. However, the conventional hydraulic grippers require a hydraulic power source. Further, some problems with the conventional hydraulic grippers is the slow take-in time to operate the retraction of the grippers, also they are very heavy in overall weight. Other problems include inflexible 2000-6000 PSI hoses. There are also environmental concerns using the conventional hydraulic grippers due to typical leaks, resulting in literally an EPA issue when cleaning up after a leak.

Regarding conventional electromagnetic motor grippers, these devices include an electromagnetic motor (servo, stepper, or similar motor) that actuates the fingers, arranged typically through a gear train. The conventional electromagnetic motor grippers require electricity to operate and a controlling CPU. However, some problems with the conventional electromagnetic motor grippers is that they are very slow as to an amount of take-in time for geared units, as well as have a weak grip when compared to the same weight of conventional air driven units. Other problems include a very poor grip strength to gripper weight ratio, along with the overall weight is heavy. Further problems include heat dissipation to the motors which results in limiting the overall strength.

Regarding conventional suction and vacuum grippers, these devices include a vacuum pump or vacuum venturi that generates a low-pressure area, sucking the gripped object against a nozzle which retains the object (alternative: an intermediate conformal sack of grit such as coffee grounds or crushed walnut shells subject to vacuum "jamming" is used as a "soft hand"; with no vacuum, the sack conforms to the object; under vacuum the grit locks together and grasps the desired object). The conventional suction and vacuum grippers require electricity or compressed air to generate the vacuum. Some problems with conventional suction and vacuum grippers is that they have very slow take-in time (>3 seconds), along with weak gripper strength. Other problems include not "locating", the grasped object's pose which is uncontrolled, other problems is the encompassing of the grasped object is inaccessible in the sack.

Regarding conventional biomimetic/anthropomorphic grippers, wherein these devices include a gripper that attempts to be an analogue of an animal or human organ of manipulation. For example, a "tentacle" gripper attempts to combine the actuation of an octopus tentacle with the vacuum gripping disk of many cephalopod organisms, using an arm and gripper that are pneumatically driven.

There is a pressing need to develop a gripper that is lighter in weight than conventional grippers, provides sufficient gripping force and gripping speed to address today's applications, along with being controllable for truly dexterous manipulation over that of conventional grippers. The present disclosure is looking to achieve "dexterous" gripping, gripping that is not only precise, but capable of movement within the gripper (analogous to the motions of a human finger when writing cursively), and also with high quality position (biologically analogous to prioreception) and force (biologically analogous to muscle effort) feedback.

SUMMARY

Some embodiments relate generally to robot manipulators having grippers or robotic end effectors. In particular, the present disclosure discloses a gripper based on biomimectic principles having constant-length tensioned cable drives to remote feedback direct-drive servomotors and software control.

The present disclosure addresses the problems of conventional grippers, i.e. conventional robotic end effectors ("grippers"), that lack dexterity, among other aspects. Wherein the conventional grippers, including pneumatic, hydraulic, electromagnetic, and vacuum grippers, all have attempted to provide a level of dexterity to meet today application, but none are particularly dexterous, among other aspects. For example, each conventional gripper, i.e. conventional robotic end effectors ("grippers"), other aspects relate to, by non-limiting example, specific problems including weaknesses such as an amount of robot endpoint weight loading, lack of feedback (both position feedback and force feedback), along with poor adaptability to different objects including linear and non-linear shapes, weight and outer surface textures.

The present disclosure overcomes the limitations of the conventional grippers, by developing a gripper that is simultaneously fast, strong, dexterous, compliant, and with excellent force feedback, when compared to conventional grippers. For example, the robot gripper of the present disclosure can be lighter than a kilogram, yet both strong enough to lift substantial weight, by non-limiting example, a construction hammer, as well as dexterous enough to roll a strawberry between each gripper fingertips without crushing the strawberry or some other delicate like object.

The weight of the gripper becomes especially important for precision robotic operations such as assembly. For example, consider a common commercially available robot such as the Mitsubishi Electric MELFA RV-4FL. This robot has a maximum payload of 4 kg; therefore, any gripper of any technology weighing more than 4 kg is simply unusable on this robot. Likewise, if this robot were to be used to assemble air conditioner fans, if the fan armature weighed 2.5 kg, then the gripper could weigh at most 1.5 kg.

One could always specify a stronger robot to compensate for the heavy gripper plus a work piece combination, but a stronger robot will be more expensive, consume more energy, and often will be slower to accelerate and decelerate because of its greater frame mass. A stronger robot will usually be larger as well, and may not fit into the work cell or down inside the assembly. All of these factors decrease profitability of the assembly operation.

Obviously, the best gripper is a gripper that weighs nothing at all, and can carry an arbitrarily shaped load of infinite mass with zero grip position error. Since such an ideal gripper is impossible, the embodiments of the present disclosure address these challenges faced with conventional gripper technologies, by creating a gripper with the best weight/payload ratio possible, and that can grip many possible payloads with adequate accuracy (and, if possible, with positional feedback, so the gripper controller or robot controller can use a negative feedback loop such as a PID control loop to drive the final position error to zero).

As a first order approximation, we consider a gripper's "figure of merit" to be the maximum mass the gripper can grasp with acceptable error, divided by the mass loading inflicted on the robot by the gripper alone. At least one of the goals of the present disclosure is to greatly improve this figure of merit over conventional robotic gripper designs.

At least one realization of the present disclosure is that most if not all prime movers, except electromagnetic motors, are too slow, heavy, or uncontrollable for dexterous manipulation in view of today's applications. Therefore, the present disclosure utilizes electromagnetic motors, in particular electromagnetic servo type motors, with direct coupling (not geared-down), for speed and direct torque feedback. The present disclosure chooses direct coupling so that the motor servo control loop directly senses feedback forces and can therefore drive position error to zero. Based on experimentation, it was learned that using an intermediate gear-down mechanism greatly decreases feedback force sensitivity and makes feedback on force (rather than position) very difficult (and in the case of some gear-down mechanisms such as worm drives, the drive chain is self-locking without input shaft motion and so force/torque measurement is impossible.)

Unfortunately, direct-drive electromagnetic motors with adequate force are generally too heavy to put on most robot grippers or even robots. Therefore, another realization of the present disclosure is the need to move the drive motors off the gripper assembly and use some other method or approach to move a force from a motor shaft to the gripper itself.

Through experimentation, was learned how to overcome the limitations of the electromagnetic motor. First, the gripper motors were placed on an independent mount, near the robot gripper but not carried by the robot itself or loading the robot with the motor mass. Further, pairs of sheathed cables (known technically as sheathed cables or more commonly as "bicycle brake cables") were introduced to address the cable translation and associated frictional forces associated with cables traveling from the robot gripper to a remote distance to the motors. The pairs of sheathed cables transmit the force as differential tensions from the motor mounts of the motors, or motor assembly, to the gripper or gripper assembly. From experimentation, we learned and realized of using bicycle brake cable technology which can be ideal for this type of application, as bicycle brakes sustain tensions of over 500 newtons' with wear limits in the hundreds of thousands to millions of cycles, and mass production makes the price/performance ratio of this technology excellent. In fact, should this level of tension be inadequate with regard to applications of the present disclosure, motorcycle clutch and brake cables may be used extend the performance upward to thousands of newton's which was also realized from experimentation.

By using differential pairs of cables, this eliminates the use of prior art of conventional tensioning springs from the forward force transmission path and the return force feedback path, and thus can have full strength and full force resolution on both contracting (normal grip) and internal (expanding) grips. There is no "under-actuation" or return springs in the present disclosure, even on grasping on a back side of the fingers; every motion is directly actuated with a steel cable. Other cable materials (e.g. Dyneema) exist and are available, and some of those cable materials have even higher moduli of elasticity and even lower friction. However, steel cables emerge as a definite leader in terms of price-performance ratio.

Embodiments of the present disclosure eliminated conventional return and tensioning springs by these differential pairs of cables, which also translates into further advantages that the drive motors need only provide force and motion as needed for the gripping task desired, and there is no need for the motors to continuously "fight" the conventional return springs, and there is no ambiguity in the amount of force being applied to the gripped object (modulo friction, which is quite low, another advantage/benefit). This "fighting" includes most of the most conventional compact designs such as flexible viewing-only endoscopes which generally use either a single coiled outside spring or an elastomer "spring" to provide return forces. A few conventional rigid surgical endoscopes use a push-pull mechanism with a rigid tube and an interior rod; pulling on the rod closes the grip (or cutter), pushing on the rod opens the grip or cutter. This gives tactile feedback to the surgeon, however, a negative and unwanted effect of this conventional design approach requires a rigid housing to accommodate the rod motion. Another alternative conventional design approach is the classic conventional single-cable-in-sheath arrangement (as used in the choke-control cables in antique automobiles); in this case the inner cable and outer case are both made sufficiently rigid that it is possible to push the cable into the sheath and realize a usable motion of up to 50 mm at the other end. However, such conventional arrangements are basically inflexible (minimum radii of curvature approaching 250 mm) and friction in the cable is far greater than actual useful force delivered due to side loading friction where the cable bends (after all, the inner cable must be rigid enough to be pushed through the entire casing from one end). Also a problem is that the side loading force of each segment of the semi-rigid cable adds to the force resistance seen by the prior segment, such push-pull semi rigid cable become length-limited very rapidly. Because of this conventional design approach, the semi rigid cable is free to move traversely within the tube of the cable sheath, there is considerable "play" (lost motion) between the ends of the cable, so accurate positioning is impossible without a secondary feedback path (i.e. a camera view of the actual position of the far end) and the high friction in such push-pull semi rigid systems makes force feedback essentially impossible. Thus, these conventional design approaches were not further researched or experimented with due to not meeting some goals of the present disclosure along with meeting today's gripper technology needs.

Returning to the present disclosure, the differential motion of the cables can be re-stated that every cable has a reverse twin; as one cable is pulled from the gripper (say, to flex the finger) another cable (termed the reverse twin cable) retracts toward the gripper; to reverse the motion of the finger, that reverse twin cable that retracted is pulled, and the original pulled cable itself retracts—and most importantly, that these motions are equal and opposite.

The equal and opposite property removes the need for conventional tensioning springs in the system, as the drive cable can then be wound on the servo motor windlass as a simple one-layer wrap and maintain constant tension (to the first order, there is a second order cosine term as the windlass's wrap moves axially with large rotation counts, but in actual use this term can be made arbitrarily close to constant and therefore tensioning springs are not needed in the actual application of the present disclosure.)

This reverse twin property can in fact be loosened in the case of computer-controlled grippers to state that when an otherwise-unrelated joint is actuated, the reverse-twin pair of cables may or may not undergo a matched retraction/extension motion; thus motion of one finger joint may cause other finger joints to rotate as well, unless the controlling computer commands compensating motion. As long as the equal and opposite reverse twin property holds, the features of full feedback, direct actuation, and no "return springs" are still maintained.

Some embodiments of the present disclosure can include the actual coupling of the cable ends to the gripper fingers during motion acts to lay and unlay the two cables in opposing circular, constant radius tracks of equal diameter, so the motion of one cable is matched by an equal and opposite motion of the reverse twin cable. This circularity is optional, such that a pair of cable tracks maintaining equal and opposite motions can be acceptable, even if the translation of angular motion to linear cable motion are not constant, linear, or even monotonic.

Also in some embodiments of the present disclosure, the cable sheaths can be intentionally terminated at the gripper base, thus keeping the fingers more flexible by removing the need to maintain torques against the cable sheaths.

At the gripper base, the cables exit their sheaths, and the twin cables for the first joints (proximal joints, in analogy to the terms of human hand anatomy) terminate in these opposing circular constant radius tracks of equal diameter. Further pairs of twin cables proceed up into the finger's first segment (the proximal phalange, if one uses analogy to human anatomy).

However, in order to maintain the reverse twin property that no matter what motions the gripper undergoes, each cable twin pair must always preserve the equal and opposite property, which would require the use of flexible cable sheaths in small lengths within the finger's proximal phalange which may work, but such short cable lengths are not very flexible, so from experimentation we use an entirely different mechanism, helical pulleys.

A helical pulley is different from a normal conventional pulley. Where the normal conventional pulley has a single groove around the periphery that joins itself after a single 360 degree turn around the pulley body, a helical pulley has a wider face and a narrow groove similar at first glance to a screw thread that makes multiple turns around the pulley body. The groove may make as few as one complete turn, but preferably in the present disclosure can include five to six turns may work best. At least one groove shape used during experimentation that proved useful for the helical pulley's groove is not the standard 60-degree thread form, but rather a round-bottom groove; this minimizes friction and binding of the cable being forced into the root of a V-groove thread form by tension.

At least one justification for the helical pulley can be visualized best by at least one experiment, both a helical pulley and a conventional pulley have about the same friction when the cable wrap angle is 180 degrees or less.

However, if one wraps a conventional pulley more than 180 degrees, one finds the cable starts to rub on itself between the entry and exit paths. This friction begins to effect the conventional pulley efficiency severely when the wrap angle approaches 270 degrees, and at wrap angles of 360 degrees or more, the cable can self-overwrap, effectively locking the cable to the pulley and completely stopping motion (in effect, this is how a sailboat's capstan winches grab and hold a rope under tension; overwrapping friction, not any mechanical positive locking, couples motion of the capstan into tension in the line.)

In contrast, with a helical pulley, the helical groove separates the turns of cable, so the entry and exit cables never rub or overwrap, even when the wrap angle exceeds 720 degrees (as long as the turn-to-turn pitch of the helical pulley is larger than the cable diameter). Thus, a helical pulley provides a way for tension in our differential cable system to be propagated across a rotating inter-phalange joint even with large wrap angles.

Additionally, a single helical pulley can provide this degree of freedom for both cables of a differential pair while preserving the reverse twin property. Consider the following gedanken experiment of a reverse twin cable pair crossing a phalange hinge joint that is perfectly straight. One cable of the twin pair enters the phalange hinge joint elevated above the phalange hinge centerline at an offset of +r (r being the helical pulley radius), wraps a full 360 degrees around the pulley, and then continues out of the phalange hinge joint at the same +r offset. The other cable in the twin pair enters the hinge at an offset of—the helical pulley radius, and wraps a full 360 degrees in the opposite direction around the same helical pulley, and continues out of the phalange joint, again with the same −r radius offset. The length of cable consumed in the wraps is two full turns, or 720 degrees.

Now, bending the phalange joint a tiny amount, approximate one degree. One cable now has wrapped only 359 degrees, while the other cable wraps 361 degrees. Yet the total amount of cable wrapped in the joint remains exactly constant (two full turns, 359+361=720 degrees), and the reverse twin property is exactly preserved.

In general, this property holds true, as one cable wraps a further N degrees around the helical pulley, the other cable simultaneously unwraps by N degrees, thus for a helical pulley of constant diameter no overall length changes of the reverse twinned cable occurs, and as the reverse twin property is maintained, then the no springs needed property is maintained.

Thus, it is possible to produce a two-phalange reverse twin robotic gripper finger with one helical pulley in the first (proximal) joint. Also possible is to produce a three phalange reverse twin robotic gripper finger with two helical pulleys in the proximal joint, and one helical in the middle ("intermediate", in human anatomy terms) joint.

It is also the case that a helical pulley can have more than one "start", with the effect being that there are two helical tracks interlaced on the helical pulley, so two cables can overlap in position without any interference. Even if the helical pulley has only one start, it is possible (and in fact employed in the invention) for two cables to share the same helical groove. Consider that we might label positions along the helical groove with the total number of degrees of rotation from one end, so the first turn of helical groove is 0 degrees, 1 degree, 3 degrees . . . up to 359 degrees. The second turn of helical groove is then 360 degrees, 361 degrees . . . up to 719 degrees, the third turn starts at 1,080 degrees rotation, and so on. So to employ this, for example one cable of a twin occupies from 360 to 720 degrees, and the other cable of the twin occupies from 180 degrees further—900 degrees to 900+360=1260 degrees.

As a secondary note, consider that although the helical pulley's axis should be concentric with the phalange hinge axis being compensated for, it is not the case that all of the phalange axes must be parallel with each other; it can be advantageous if the phalange hinge axes are not parallel.

To understand this, consider a phalange such as an analogue of the proximal phalange of a human thumb, where the hinge axis at the palm end of the phalange might nearly perpendicular to the hinge axis at the distal end (a real human thumb has two degrees of freedom here, but the major interesting degree of freedom in the human thumb is a first hinge action whose axis is perpendicular out of the plane of the palm of the hand and enables the opposing thumb gripping action, whose hinge action is perpendicular to that first thumb hinge.)

Such a robotic phalange might be implemented using the reverse twinned cable method using ordinary pulleys to relocate the cables rotationally around the phalange center, but it is interesting and useful to note that even without additional ordinary pulleys, there is no absolute need to have the axes of two adjacent phalange hinges and their helical pulleys parallel. The cables running between the helical pulleys can be skewed within the bounds of the helical pulley's groove acceptance angle and the reverse twinned property is maintained (and, like the motor windlass, this arrangement has a second-order cosine error term that can be engineered into a near-constant value.) Indeed, for certain values of face width and diameter, the skew angle can be exactly zero (again, cosine error term applies)

These are at least some of the basics of how the present disclosure operates; other design issues and improvements over the conventional art is described as reviewing the figures of the present disclosure. At least one result is a robot gripper that demonstrably a very light load on the robot effector endpoint (far less than 1 Kg), the strength to lift a full size hammer, and the dexterity to roll a strawberry between the fingertips without crushing the fruit, is extraordinary when compared to the conventional robotic gripper devices.

Further examples of how this dexterity is achieved are shown below and in the figures of the present disclosure. The present disclosure through experimentation has achieved "dexterous" gripping, gripping that is not only precise, but capable of movement within the gripper (analogous to the motions of a human finger when writing cursively), and also includes a high quality position (biologically analogous to priopreception) and force (biologically analogous to muscle effort) feedback, among other aspects.

Because the gripper of the present disclosure has such a simple endpoint effector, there is plenty of additional room to add endpoint sensors, such as touch and pressure sensors to the inside and outside of the phalanges, as well as specialized in-finger tooling (magnetic nut holders, wire cutters, wire stripping notches, etc.) making the gripper highly multifunctional.

Accordingly, one embodiment discloses a robot gripper, including at least two grippers of a grasper assembly configured to perform grasping motions via actuation of independent cable ends of a plurality of cables, and configured to move toward or away from each other to perform the grasping motion. Wherein each gripper is actuated by a pair of cables, a cable of the pair slides in a flexible sheath when actuated by a motor, moving the gripper in an opposite direction of an other cable of the pair also in a flexible sheath, providing equal motions of each cable in the pair in opposite directions. A motor assembly including the motors is mounted at a location separate from the grasper assembly with the flexible sheathing extending between the assemblies. Such that the separate assembly mounting arrangement provides for maintaining a ratio between a gripping force of the grippers to an overall mass of the grasper assembly, resulting in improving an overall performance of the robot gripper.

A robot gripper including at least one gripper of an assembly configured to perform motions via actuation of independent cable ends of a plurality of cables. Wherein the at least one gripper is actuated by a pair of cables, a cable of the pair slides in a flexible sheath when actuated by a motor, moving the gripper in an opposite direction of an other cable of the pair also in a flexible sheath, providing equal motions of each cable in the pair in opposite directions. Such that the pairs of cables operating the at least one gripper are directed around a joint between segments via helical pulleys, the helical pulleys include a groove structure that is u-shaped grooves. A motor assembly including at least one motor is mounted at a location separate from the assembly with the flexible sheathing extending between the assemblies. Such that the separate assembly mounting arrangement provides for maintaining a ratio between an applied force of the at least one gripper against an object to an overall mass of the assembly, resulting in improving an overall performance of the robot gripper.

Another embodiment discloses a robot end effector, including at least two grippers of a grasper assembly configured to perform grasping motions via actuation of independent cable ends of a plurality of cables, and configured to move toward or away from each other to perform the grasping motion. Wherein each gripper is actuated by a pair of cables in flexible sheathing connected to a motor, moving the gripper in an opposite direction of an other cable of the pair, providing equal motions of each cable in the pair in opposite directions. Such that the pairs of cables operating each gripper are directed around a joint between segments via helical pulleys. A motor assembly including the motors is mounted at a location separate from the grasper assembly with the flexible sheathing extending between the assemblies. Such that the separate assembly mounting arrangement provides for maintaining a ratio between a gripping force of the grippers to an overall mass of the grasper assembly, resulting in improving an overall performance of the robot gripper.

A robotic prehension device, including at least two claws of a gripper assembly configured to perform gripping motions via actuation of independent cable ends of a plurality of cables, and configured to move toward or away from each other to perform the gripping motion. Wherein each claw is actuated by a pair of cables in flexible sheathing connected to a motor, the flexible sheathing is rotatably and slidably extending over each cable and capable of withstanding forces. Such that the pairs of cables operating each claw are directed around a joint between segments of each claw via helical pulleys, and the opposing cables in each cable pair wrap in opposite directions around a single helical pulley, with a wrap angle greater than 180 degrees. A motor assembly including the motors is mounted at a location separate from the gripper assembly with the flexible sheathing extending between the assemblies. Such that the separate assembly mounting arrangement provides for maintaining a ratio between a gripping force of the claws to an overall mass of the gripper assembly, resulting in improving an overall performance of the robot prehension device.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 5A is a schematic illustrating how the gripper assembly 1 of FIG. 1 is cabled with respect to motion of proximal phalange, according to some embodiments of the present disclosure;

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The present invention relates generally to robot manipulators, and more particularly robot manipulators having grippers or robotic end effectors.

Figure 1:
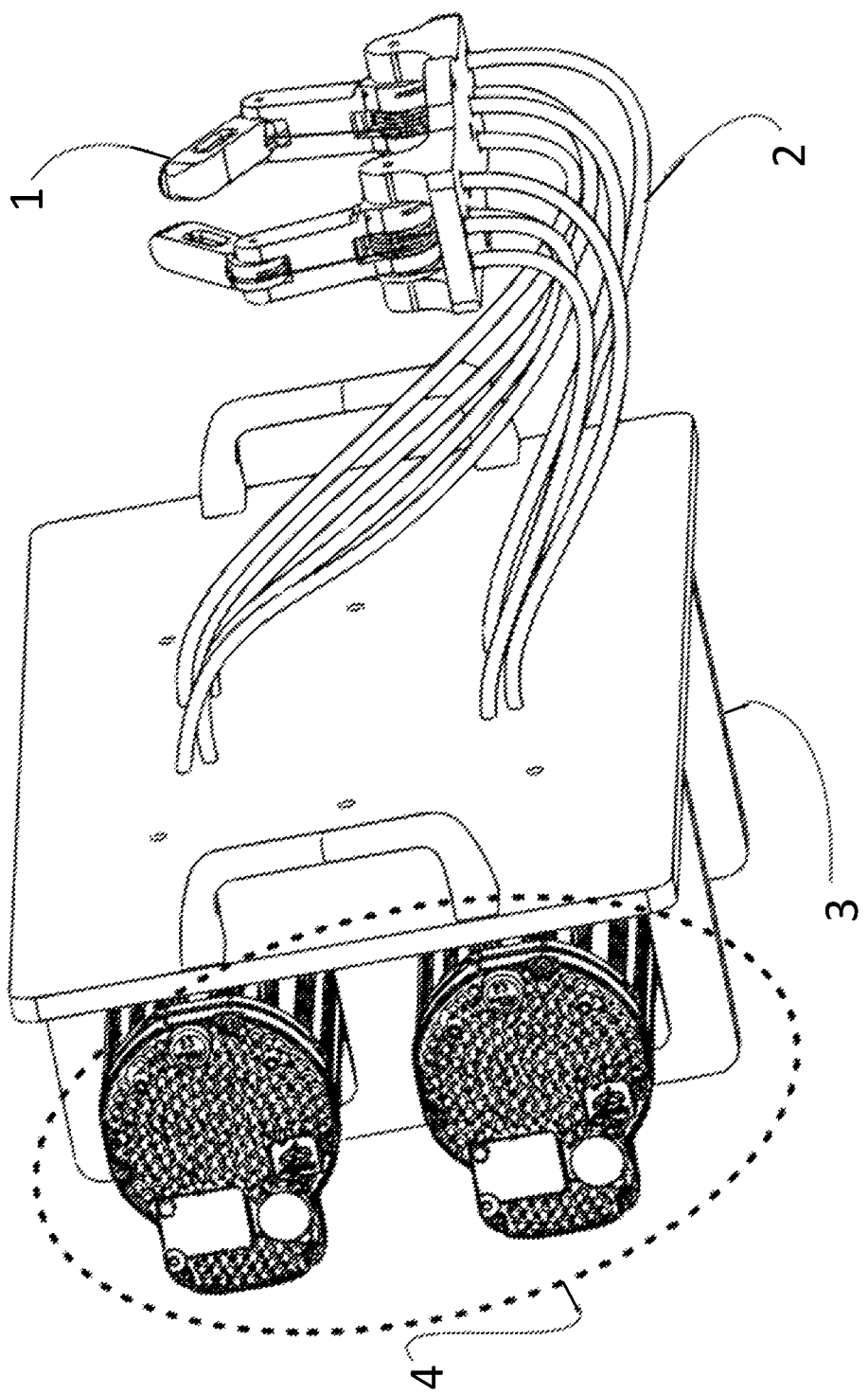
FIG. 1 is a schematic illustrating an overview of the gripper system, according to an embodiment of the present disclosure.

FIG. 1 is a schematic illustrating an overview of the gripper system, according to an embodiment of the present disclosure. The gripper endpoint assembly 1 is designed to mount on an end of a common industrial or research robot. A set of flexible reverse twinned cables 2, in flexible sheaths, connects the gripper endpoint assembly 1 to the motor mount 3, containing as many servo motors 4 as needed to actuate each remote degree of freedom in the gripper endpoint assembly 1. Servo motors 4 are located distally or apart from the gripper endpoint assembly, and may be cooled by fans or other like devices.

Some embodiments of the present disclosure can include the reverse twinned cables 2 are made from bicycle brake cables, but any similar tension-preserving cables with outer sheaths (shifter cable, motorcycle throttle, brake, or clutch cable) will function.

Still referring to FIG. 1, note that at least one implementation of the present disclosure can have all degrees of freedom for the gripper endpoint assembly 1 actuated via reverse twinned cables 2. Although, this is not completely necessary; in some specific applications a gripper-mounted actuator (such as a fine tweezer, a drill, a grinder, etc.) might be mounted on the endpoint gripper assembly and any degree of freedom associated with that particular action could be powered by an actuator mounted on the gripper endpoint assembly 1.

Some embodiments of the present disclosure can have the servo motors 4 design that accepts positioning commands (either as software commands, or as step-and-direction motion akin to a stepper motor) and returns status to the controller, such as actual position, commanded versus actual position error, motor drive current, and shaft torque.

Figure 2:
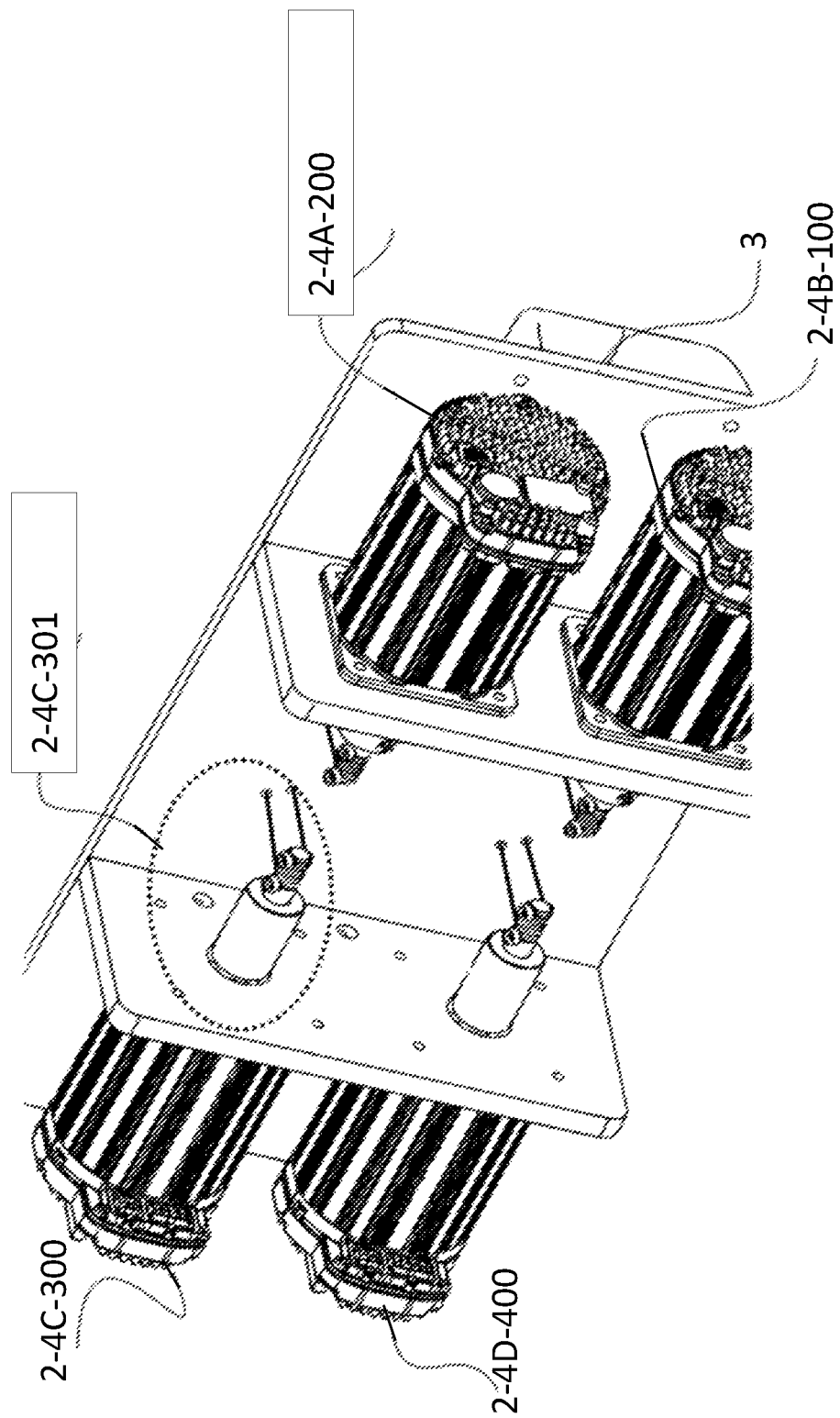
FIG. 2 is a schematic illustrating a motor mount and a servo motors of a motor assembly of the gripper system of FIG. 1, according to some embodiments of the present disclosure.

FIG. 2 is a schematic illustrating a motor mount and a servo motors of a motor assembly of the gripper system of FIG. 1, according to some embodiments of the present disclosure. For example, servo motors 2-4B-100, 2-4A-200, 2-4C-300, and 2-4C-400 mounted to the back of motor mount 3. Each of these servo motors drives a cable windlass assembly such as cable windlass assembly 2-4C-301, which we will see in detail in FIG. 3.

Figure 3:
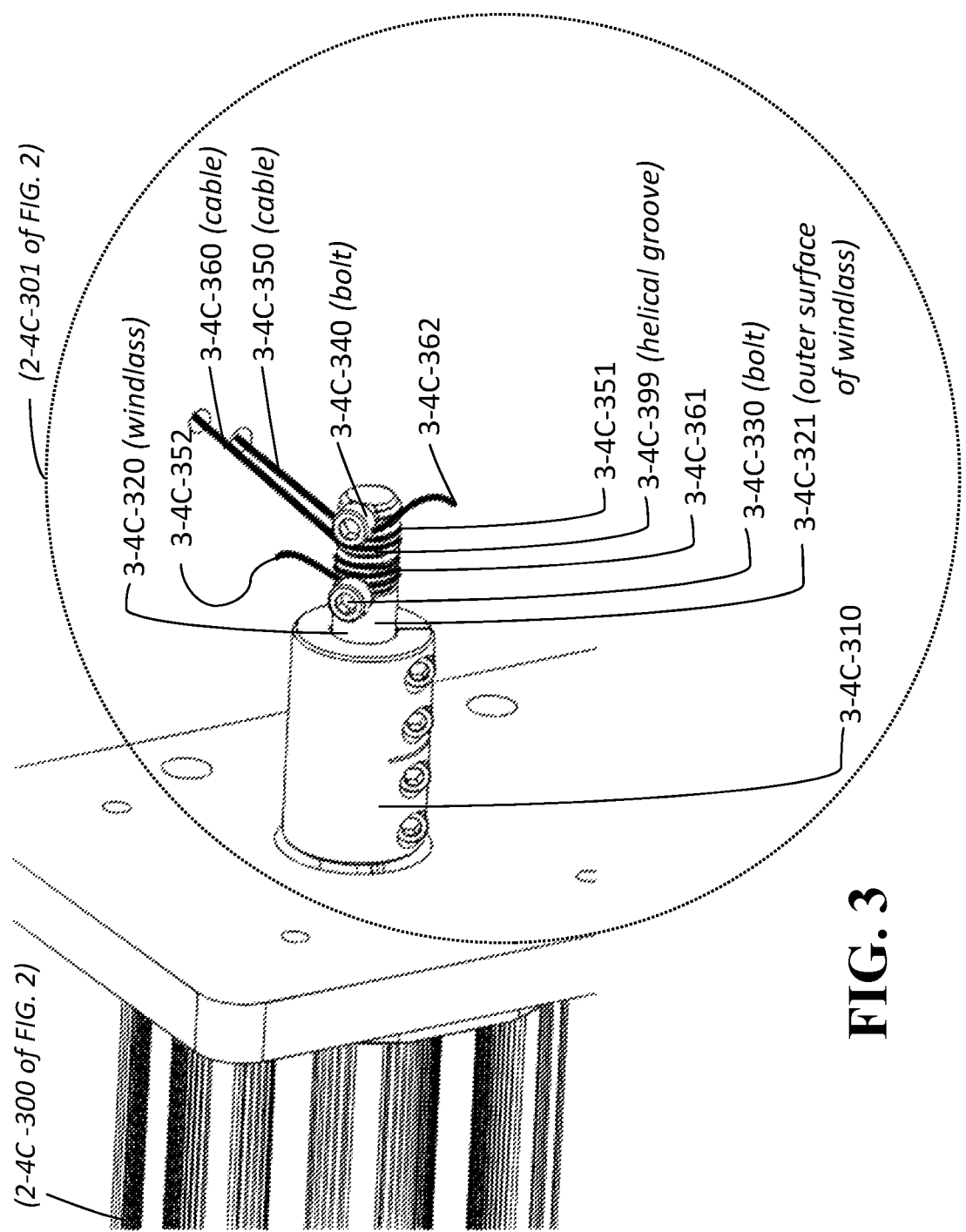
FIG. 3 is a schematic illustrating an assembly 2-4C-301 of the gripper system of FIG. 1, according to some embodiments of the present disclosure.

In FIG. 3 is a detailed assembly 2-4C-301 in full. In at least one implementation, to minimize extra parts cost and count, and eliminate any possibility of gear lash, the rigid shaft coupler 2-4C-310 is mounted directly on the shaft of direct-drive servo motor 2-4C-300. Windlass 2-4C-320 is inserted into the opposite end of shaft coupler 2-4C-310. In many applications the shaft of motor 2-4C-300 is strong enough to support the full side loads imposed by windlass 2-4C-320 and so no additional bearings are needed, however another preferred implementation places inboard and outboard bearings on windlass 2-4C-320 and replaces the rigid shaft coupler 2-4C-310 with a flexible shaft coupler to allow misalignment between servo motor 2-4C-300 output shaft and windlass 2-4C-320.

Windlass 2-4C-320 itself implements the helical pulley methodology in order to drive reverse twinned cable pair 2-4C-350 and 2-4C-360 in a precise reverse relationship. Rather than winding on a flat surface, a helical groove 3-4C-399 (preferably with a rounded profile rather than a V-shaped profile) is cut into the outer surface 2-4C-321 of windlass 4320. Cable 2-4C-360 exits its cable sheath and passes over the top outer surface 2-4C-321 of windlass 2-4C-320, and winds several turns 2-4C-361 in helical groove 2-4C-399 about windlass 2-4C-320 in a counter-clockwise direction as viewed from the open end of windlass 2-4C-320, then proceeds under securing bolt 3-4C-340 and terminates in free end 3-4C-362.

Still referring to FIG. 3, similarly, cable 3-4C-350 exit's it's cable sheath, and passes under the bottom outer surface 2-4C-321 of windlass 2-4C-320, and winds several turns 2-4C-351 clockwise (as seen from the open end of windlass 2-4C-320) in helical groove 2-4C-399, then is secured by securing bolt 2-4C-330 and terminates in free end 2-4C-352.

It can be seen that since cables 2-4C-350 and 2-4C-360 wind in opposite directions on windlass 2-4C-320, and are constrained to not overlap by helical grove 2-4C-399, that any rotational motion of windlass 2-4C-320 by servo motor 2-4C-300 will cause equal and opposite motions in cables 2-4C-350 and 2-4C-360, thus preserving the reverse twinned cable property.

Figure 4:
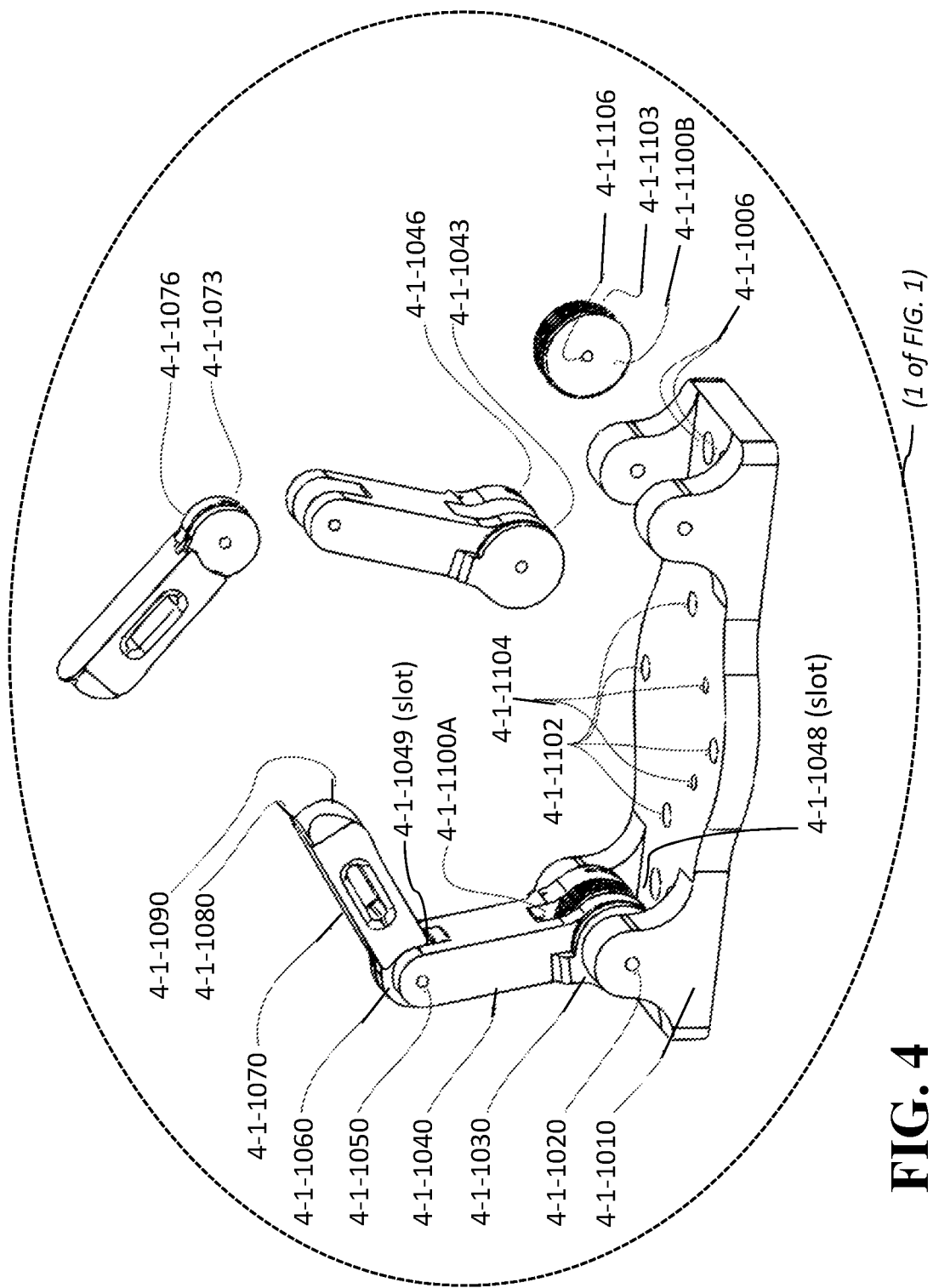
FIG. 4 is a schematic illustrating a two-fingered version of the endpoint gripping assembly, with one finger fully assembled along with the right schematic showing the major parts exploded for clarity of understanding of the gripper system of FIG. 1, according to some embodiments of the present disclosure.

FIG. 4 is a schematic illustrating a two-fingered version of the endpoint gripping assembly, with one finger fully assembled along with the right schematic showing the major parts exploded for clarity of understanding of the gripper system of FIG. 1, according to some embodiments of the present disclosure.

Noted is that this design, with two fingers, has two degrees of freedom for each finger, and the axes of rotation of all degrees of freedom being parallel is merely one preferred embodiment, highly useful but not completely defining the scope of the invention. Also noted is that described is only a single finger, which is merely an example, and most some embodiments of the present disclosure that would have multiple similarly constructed fingers.

Still referring to FIG. 4, is understood that, in some situations, it is actually cost-effective to have more fingers, more degrees of freedom, and some or all of these fingers having some degrees of freedom that are highly nonparallel to the axis of rotation of the fingertip rotation axes, especially in the first joint where the finger joins the base.

In particular, having the most proximal phalange degree of freedom's rotation axis be nonparallel to the next phalange's rotation axis yields an adaptable opposition of the gripper fingers very akin to the human hand and thumb.

Still referring to FIG. 4, working from the gripper base 4-1-1010, we have the bolt holes 4-1-1002 used to secure the gripper assembly 1 of FIG. 1 to the robot. Holes 4-1-1004 are used to secure the palm camera (shown later). Additional holes 4-1-1006 are used to allow passage of the reverse twinned cables; suitable bushings (not shown here, see FIG. 9 for details) retain the cable sheaths and allow for free passage of the cable itself.

Shaft 4-1-1020 acts as an axle for both proximal phalange 4-1-1040 and helical pulley 4-1-1100. Proximal phalange 4-1-1040 has a circular section 4-1-4-1-1030 at its lower end which carries peripheral grooves 4-1-1043 and 4-1-1046, which will guide the reverse twinned cable as described below. As grooves 4-1-1043 and 4-1-1046 are both constant radius and opposing winding direction, grooves 4-1-1043 and 4-1-1046 will preserve the reverse twinned property of any cable pair used to drive proximal phalange 4-1-1040 in rotation around shaft 4-1-1020.

Still referring to FIG. 4, proximal phalange 4-1-1040 also contains slot 4-1-1048 (shown on both assembled and exploded forms) which allows helical pulley 4-1-1100A to coexist and also rotate independently of phalange 4-1-1040 on shaft 4-1-1020, and slot 4-1-1049 which allows the proximal phalange 4-1-1040 to accept distal phalange 4-1-1070 and allow it to rotate freely on shaft 4-1-1050.

Helical pulley 4-1-1100B has a helical groove 4-1-1003 on the entire circumferential face, preferably with a rounded bottom as a normal pulley, not a 60-degree V as might easily be cut on a screw-cutting lathe with a screw-thread form bit. The central hole 4-1-1106 may either be unmodified from the material of the pulley body 4-1-1100B or may be lined with a bearing insert to reduce friction.

Still referring to FIG. 4, distal phalange 4-1-1070 inserts into slot 4-1-1049, and is secured with shaft 4-1-1050, allowing free rotation of distal phalange 4-1-1070. Both shafts 4-1-1020 and 4-1-1050 may be press-fits (with appropriate sizing of the holes to retain the shaft but allow the captured parts to turn freely) or may be retained by endcaps, adhesives, setscrews, E-clips, or other means (not shown).

Still referring to FIG. 4, distal phalange 4-1-1070 has a lower circular section 4-1-1060 which carries peripheral grooves 4-1-1073 and 4-1-1076, which will guide a reverse twinned cable as described below. As grooves 4-1-1073 and 4-1-1076 are of both constant radius and opposite winding direction, they will preserve the reverse twinned property of any cable pair used to drive distal phalange 4-1-1070 in relative rotation around shaft 4-1-1020.

Distal phalange 4-1-1070 also carries replaceable fingernail 4-1-1080 and replaceable finger pad 4-1-1090. In one preferred implementation fingernail 4-1-1080 is made of a soft metal (e.g. brass) and secured with a flathead screw, other materials and securing arrangements (e.g. actually held with adhesive) are acceptable. Replaceable finger pad 4-1-1090 can be made of neoprene, silicone, leather, or other materials, and may be retained by adhesive or mechanical interlock.

Still referring to FIG. 4, both fingernail 4-1-1080 and finger pad 4-1-1090 may contain touch and pressure sensors (not shown for complexity reasons). If the sensitivity of the gripping requires it, additional force sensors such as strain gauges may be deployed in the cable grooves and groove terminations to measure actual cable tensions at the point of gripper motion; refer below to circular grooves 5-4C-1043 etc. and cable retainers 5-4C-1630 etc. Additionally, both fingernail 4-1-1080 and finger pad 4-1-1090 may be augmented with endoscopic cameras (see FIG. 7).

Figure 5B:
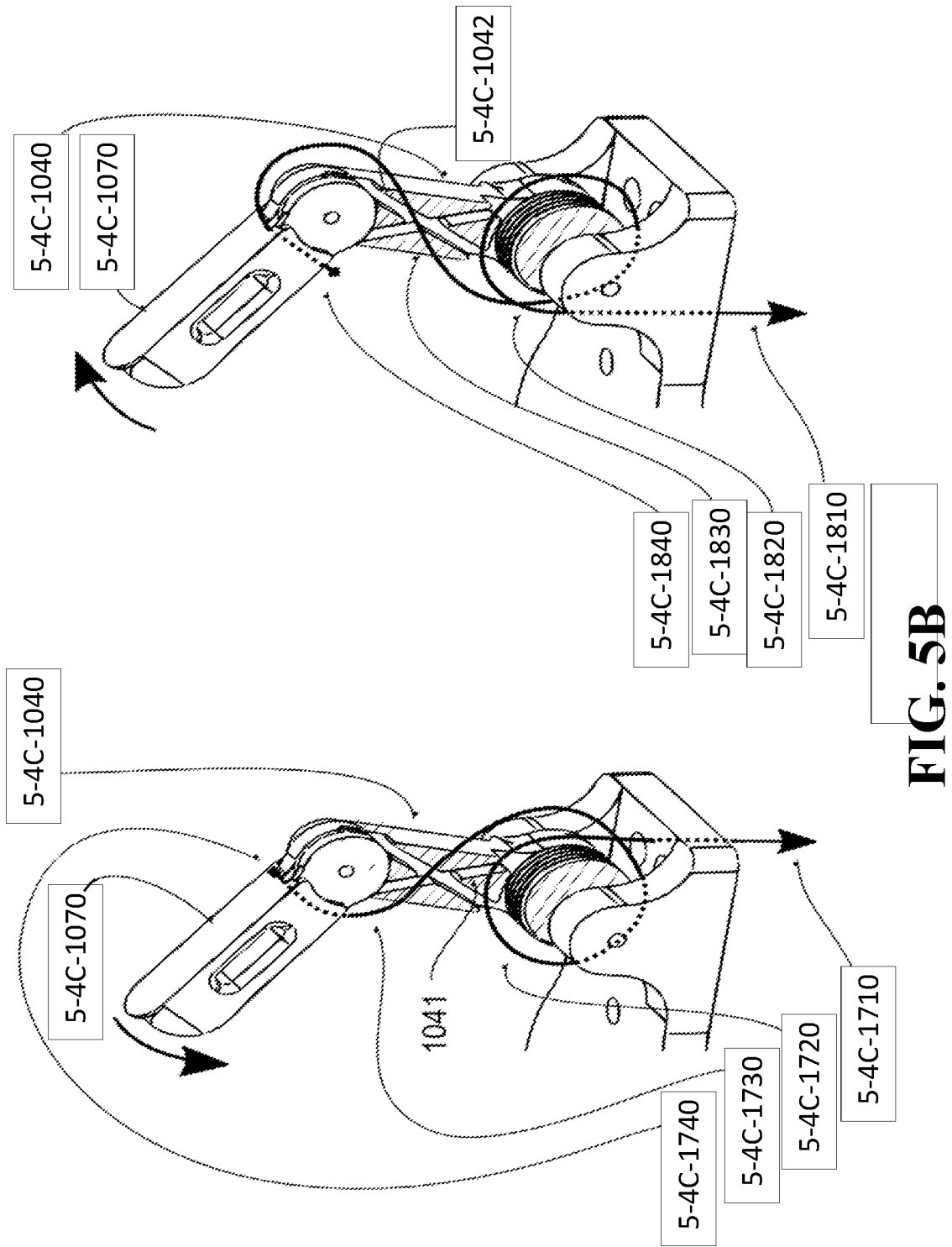
FIG. 5B is a schematic illustrating an overview of the gripper system, according to an embodiment of the present disclosure.

FIG. 5A & FIG. 5B are schematics illustrating how the gripper assembly 1 of FIG. 1 is cabled with respect to motion of proximal phalange 5-4C-1040, according to some embodiments of the present disclosure. For example, FIG. 5 shows the proximal phalange 5-4C-1040 in cutaway format, so that it is easier to see the cable pathways.

Reverse twinned cable pairs 5-4C-1510 and 5-4C-1610 enter from below the baseplate 5-4C-1010, and proceed up through the (unlabeled) cable holes 5-4C-1006. Cable 5-4C-1610, entering from below the gripper body 5-4C-1010, wraps in a counterclockwise direction 5-4C-1620 around proximal phalange 5-4C-1040 circular section 5-4C-1030, lying in circular groove 5-4C-1043 and retained against tension at by retainer 5-4C-1630, which may be a screw, compression-fit sleeve, or the cast-lead cable termination as supplied by the cable manufacturer. If needed, circular groove 5-4C-1043 and termination 5-4C-1630 and their analogous circular grooves and cable terminations throughout the design may be augmented by force sensors such as strain gauges Still referring to FIG. 5A and FIG. 5B, acting in opposition, cable 5-4C-1510 enters from below the baseplate 5-4C-1010, and proceeds up through another cable hole (not shown). Cable 5-4C-1510 then wraps in a clockwise direction 5-4C-1520 around proximal phalange 5-4C-1040 circular section 5-4C-1030, lying in circular groove 5-4C-1046, and retained against tension at retainer 5-4C-1530, which, like 5-4C-1630, may be a screw, a compression sleeve, or the cast cable termination as supplied by the cable manufacturer.

It can be seen that varying the tension on cables 5-4C-1510 and 5-4C-1610 will cause rotation of the proximal phalange 5-4C-1040 and that any force or resistance to motion encountered by proximal phalange 5-4C-1040, whether direct or indirect, will cause a differential change in the tension of cable 5-4C-1510 versus cable 5-4C-1610. This tension change will be passed directly through windlass 5-4C-4320 of FIG. 3 and coupler 5-4C-4310 of FIG. 3 where it becomes sensible to the servo motor control as a change in torque required to maintain motor position (if the motor controller is set to maintain position) or as an actual change in shaft position if the motor control is either not driving the servo motor actively or the servo motor is being operated in a compliant rather than hard position holding mode.

Figure 6A:
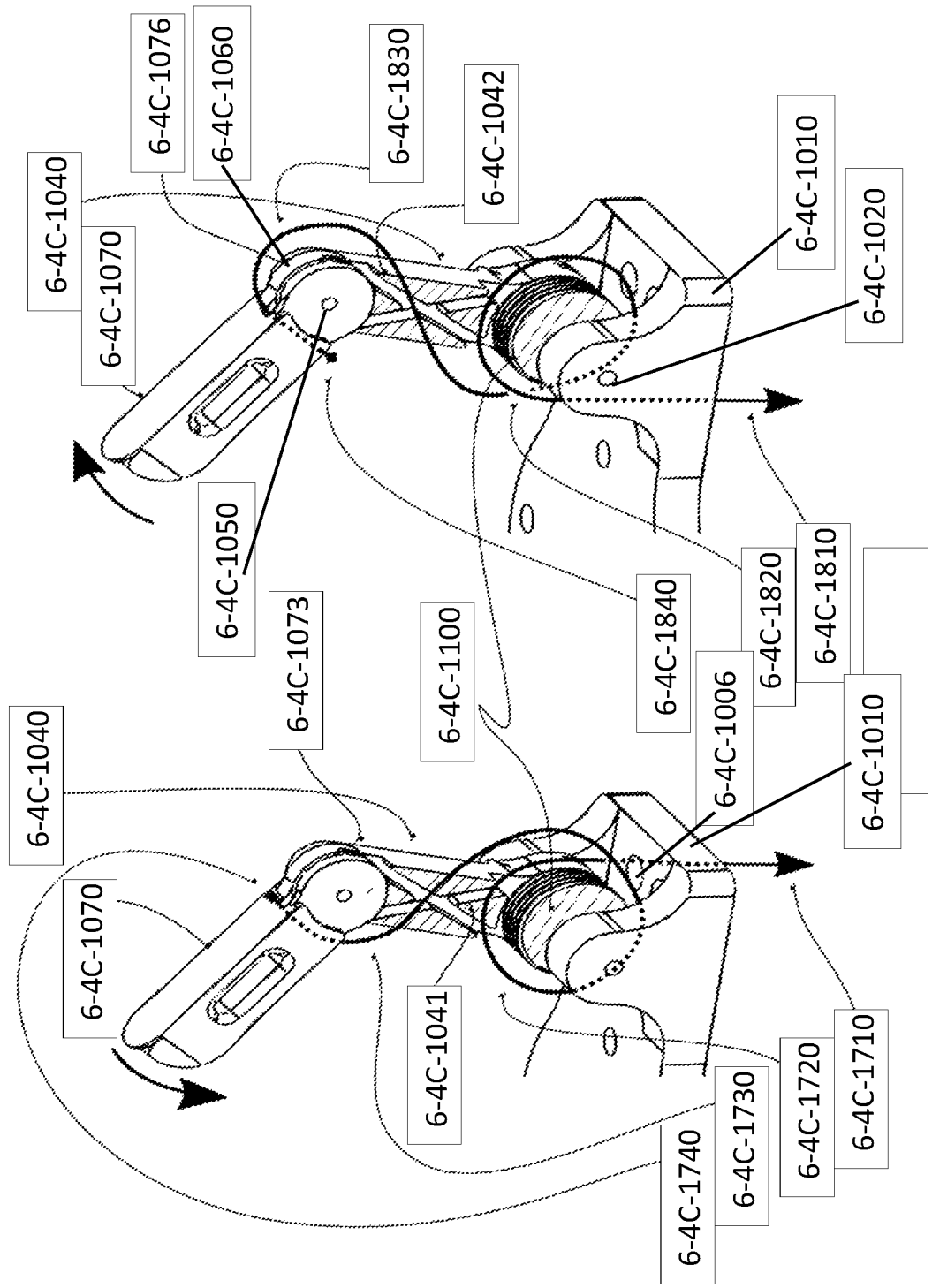
FIG. 6A is a schematic illustrating how the distal phalanges can be cabled using helical pulleys, according to some embodiments of the present disclosure.

FIG. 6A is a schematic illustrating how the distal phalanges 6-4C-1070 can be cabled using helical pulleys 6-4C-1100 according to some embodiments of the present disclosure. As before, proximal phalange 6-4C-1040 is shown in cross section; it can now be understood the purposes of internal channels 6-4C-1041 and 6-4C-1042 within proximal phalange 6-4C-1040.

On the left side of FIG. 6A, one cable 6-4C-1710 of a reverse-twinned pair exit the cable sheaths and pass through one of cable holes 6-4C-1006 of baseplate 6-4C-1010. The cable 6-4C-1710 then wraps 6-4C-1720 in a counterclockwise direction around helical pulley 6-4C-1100 approximately one full turn (360 degrees), then passes through internal passage 6-4C-1041 of proximal phalange 6-4C-1040, crossing between axles 6-4C-1020 and 6-4C-1050 to be partially wrapped 6-4C-6-4C-1730 in a clockwise direction into circular groove 1073 of lower circular section 6-4C-1060 of distal phalange 6-4C-1070, to be clamped at termination 6-4C-1740 by means of set screw, compression sleeve, or cast cable termination as supplied by the cable manufacturer. As can be seen, pulling on cable 6-4C-1710 will cause a flexion motion of distal phalange 6-4C-1070, and extensional forces on distal phalange 6-4C-1070 will cause an increase in tension on cable 6-4C-1710.

On the right side of FIG. 6A, the second cable 6-4C-1810 of reverse-twinned pair exit the cable sheaths and pass through one of cable holes (not shown) of baseplate 6-4C-1010. The cable then wraps 6-4C-1820 around helical pulley 6-4C-1100 approximately one full turn (360 degrees) then passes through internal passage 6-4C-1042 and between axles 6-4C-1020 and 6-4C-1050, to be partially wrapped 6-4C-1830 counterclockwise into circular groove 6-4C-1076 of lower circular section 6-4C-1060, to then be clamped at termination 6-4C-1840 by means of a set screw, compression sleeve, or cast cable termination as supplied by the cable manufacturer. As can be seen, pulling on cable 6-4C-1810 will cause an extension motion of distal phalange 6-4C-1070, and a flexional force on distal phalange 6-4C-1070 will cause an increase in tension on cable 6-4C-1810.

As before we note that cables 6-4C-1710 and 6-4C-1810 are a reverse-twinned pair analogous to cable pair 5-4C-1510 of FIG. 5A and 5-4C-1610 of FIG. 5A, and so motions and forces acting on the distal phalange 6-4C-1070 will translate to motions and forces acting on whichever reverse-twinned windlass cables 6-4C-1710 and 6-4C-1810 are attached to.

Still referring to FIG. 6A, at least one implementation details that cable 6-4C-1710 wrapping 6-4C-1720 around helical pulley 6-4C-1100 occupy helical pulley positions of roughly 360 to 720 degrees, and cable 6-4C-1810 wrap 6-4C-1820 around helical pulley 6-4C-1100 occupy helical pulley positions of roughly 900 to 1260 degrees. This is not an absolute necessity (and indeed two separate independent helical pulleys 6-4C-1100a and 6-4C-1100b could be used instead of single pulley 6-4C-1100) but the commonality produces a compact configuration for the joint of axle 6-4C-1020. However, if cable stretch causes a desynchronization between the free tensions of cable 6-4C-1710 and cable 6-4C-1810, which is possible in highly asymmetric tension use cases, the use of a separate helical pulley for each cable is recommended as the loss of compactness is at most one thread pitch of the helical pulleys 6-4C1100.

Noted is that motions of proximal phalange 6-4C-1040 will cause a change in angle of distal phalange 6-4C-1070 even if the windlass 3-4C-4320 of FIG. 3 attached to the cables 6-4C-1710 and 6-4C-1810 is not moved, because as cables 6-4C-1710 and 6-4C-1810 wrap and unwrap in equal and opposite amounts from helical pulley 6-4C-1100 and so constant cable tension and the reverse twin property is maintained, the endpoints nevertheless change by equal and opposite amounts and so not only does the position of shaft 6-4C-1050 change, the relative angles between proximal phalange 6-4C-1040 and distal phalange 6-4C-1070 also changes (and if cabled exactly as shown this results in a "curling finger" action of both phalanges when only the proximal phalange 6-4C-1040 is actuated).

Still referring to FIG. 6A, in many applications, this perfectly acceptable, and in a computer-controlled environment, this can be cancelled out by driving the proximal and distal servomotors in opposite directions. However, an elegant method of cabling eliminates this software fix and permits parallel motion without software intervention.

Figure 6B:
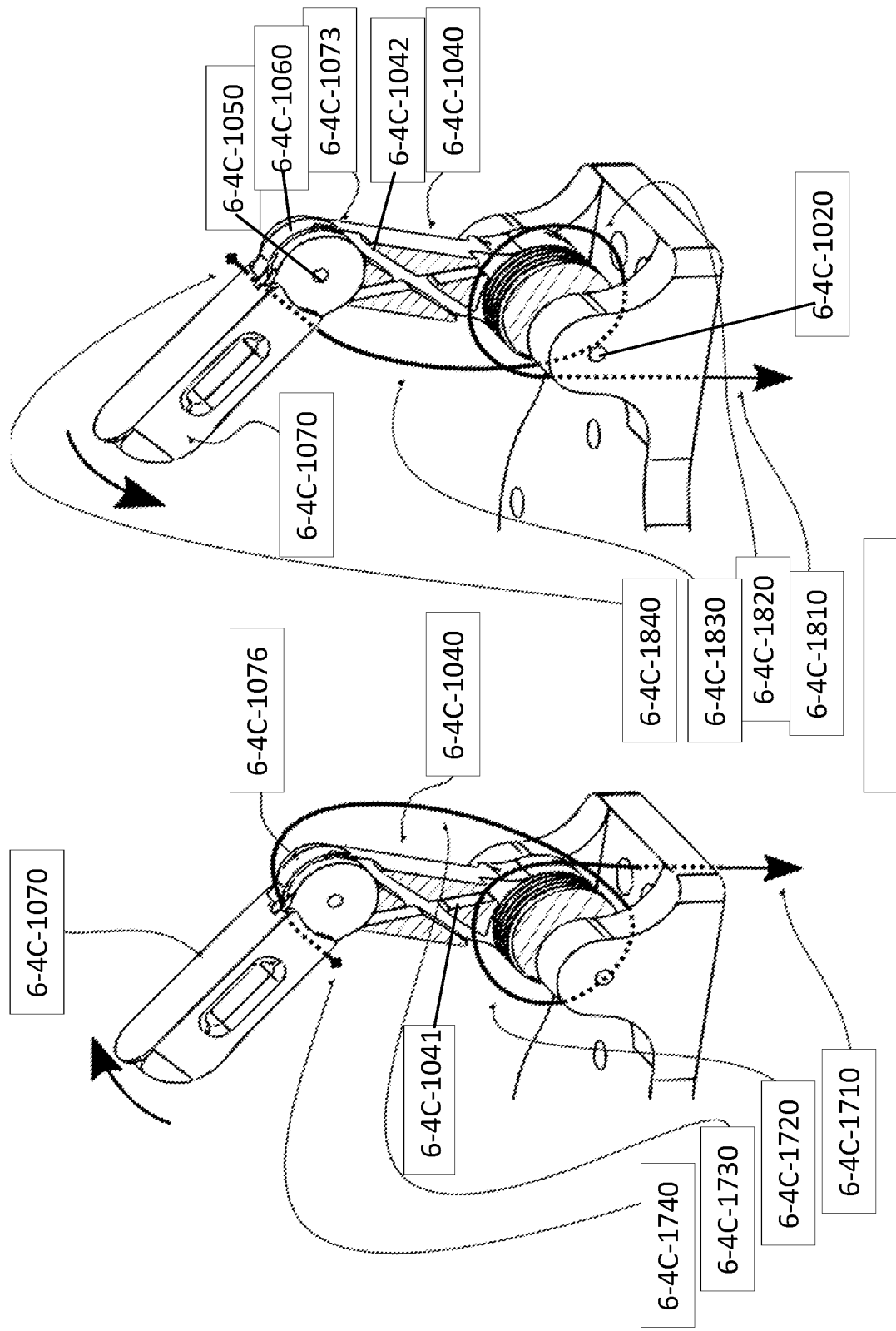
FIG. 6B is a schematic illustrating an alternate cabling method, such that a sole difference between the two cabling methods of FIG. 6A to FIG. 6B is whether cable wraps and pass between axles and or not, hence causing their wraps and around the distal circular section be clockwise/counterclockwise or counterclockwise/clockwise, according to some embodiments of the present disclosure.

FIG. 6B is a schematic illustrating an alternate cabling method, such that a sole difference between the two cabling methods of FIG. 6A to FIG. 6B is whether cable wraps 6-4C-1730 and 6-4C-1830 pass between axles 6-4C-1020 and 6-4C-1050 or not, hence causing their wraps 6-4C-1730 and 6-4C-1830 around the distal circular section 6-4C-1060 be clockwise/counterclockwise or counterclockwise/clockwise, according to some embodiments of the present disclosure.

In this alternate cabling arrangement, proximal phalange internal passages 6-4C-1041 and 6-4C-1042 are not used, which leaves the cables exposed unless the proximal phalange 6-4C-1040 is extended to provide a secondary enclosure for the cabling (not shown).

Still referring to the FIG. 6B, at least one advantage of this cabling system is that if the system is cabled as shown in FIG. 6B, and if distal circular sections 6-4C-1060 have the same diameter as helical pulley 6-4C-1100 (see FIG. 6A), then any commanded motion of proximal phalange 6-4C-1040 causes motion of axle 6-4C-1050, but the rotational motion of distal phalange 6-4C-1070 is equal and opposite, thus the angle between base 6-4C-1010 and distal phalange 6-4C-1070 is constant.

In the alternate cabling arrangement of FIG. 6B, it should be noted that the force and motion feedback of the proximal phalanges 6-4C-1040 and distal phalanges 6-4C-1070 to the servomotors 4 of FIG. 1 remain unchanged in magnitude, although there may be a change of sign (direction).

Still referring to FIG. 6B, it should also be noted that although we have found it perfectly acceptable to allow helical pulley 6-4C-1100 (see FIG. 6A) to "float" in rotational relationship to cables 6-4C-1710 and 6-4C-1810, some embodiments would prefer to assure that non-cumulative motion of helical pulley 6-4C-1100 causes the cable windings 6-4C-1720 and 6-4C-1730 to drift to the end of the helical pulley groove 4-1-1103 (see FIG. 4) and fall off or jam. This can be prevented by several means, for example, by adding a set screw similar to attachment screw 3-4C-4340 of FIG. 3 to the appropriate section of helical pulley 6-4C-1100, by using an intermediate compression sleeve on cable 6-4C-1710 or 6-4C-1810 that fits into a deepened section of helical groove 4-1-1103 (see FIG. 4), or simply by a blob of epoxy on one of cables 6-4C-1710 or 6-4C-1810. Only one of the cables per reverse twinned pair should be so anchored to the helical pulley groove 4-1-1103 (see FIG. 4), otherwise it would not be possible to set a uniform tension and zeroing position for an entire reverse-twinned cable set from windlass cable attachment screws 3-4C-4330 of FIGS. 3 and 3-4C-4340 of FIG. 3. In some cases, it would be advantageous to use two helical pulleys 6-4C-1100a and 6-4C-100b, each separately anchored to their respective cables. This absolutely prevents cumulative drift at the expense of assembly simplicity.

Figure 7:
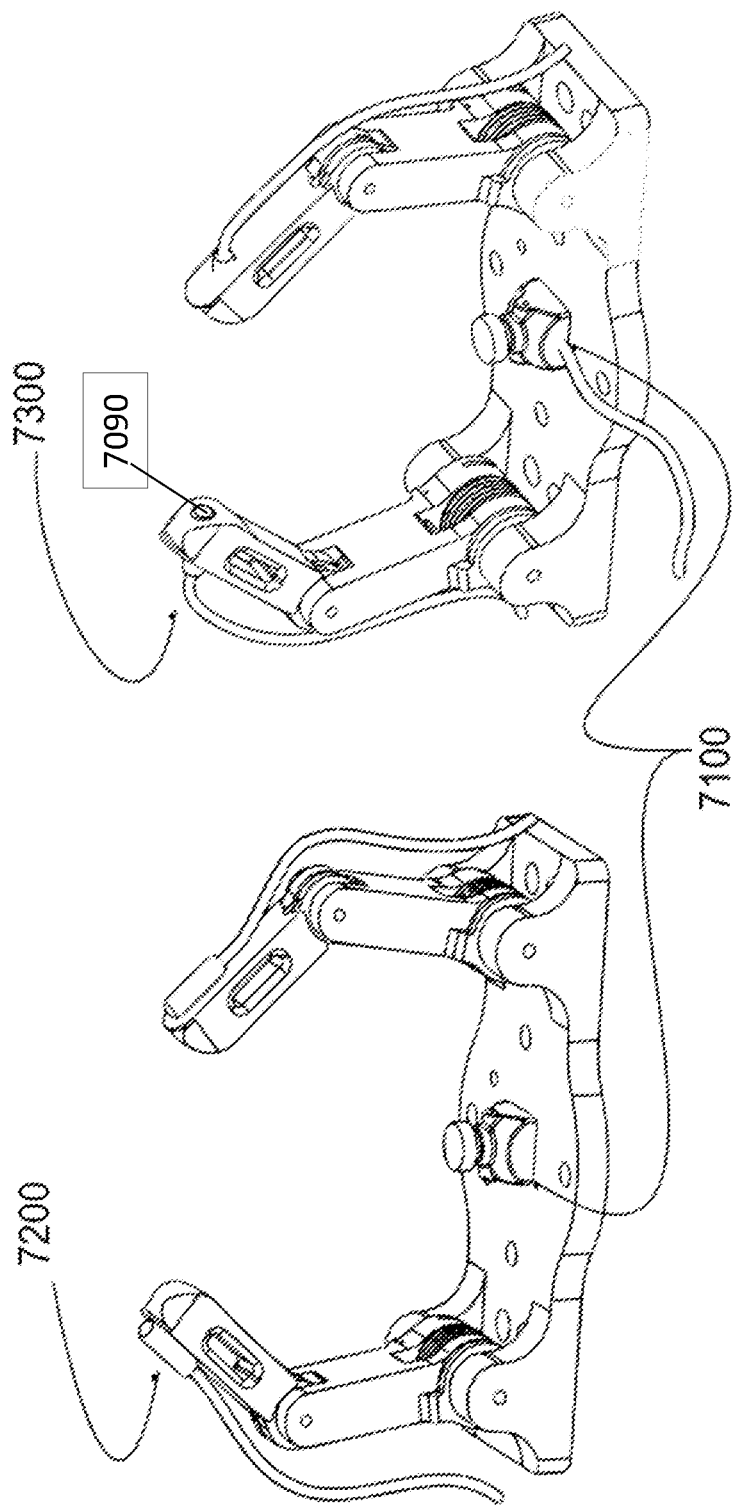
FIG. 7 is a schematic illustrating how finger cameras may be arranged, according to some embodiments of the present disclosure.

FIG. 7 is a schematic illustrating how finger cameras may be arranged, according to some embodiments of the present disclosure. Palm camera 7100 mounted on the baseplate of the gripper assembly 1000, as well as a fingernail camera 7200 and a through-the-finger pad camera 7300. In the latter case, it would be necessary to have either a hole in the finger pad 7090 (which is similar to 4-1-1090 of FIG. 4) or make the finger pad 7090 (which is similar to 4-1-1090 of FIG. 4) out of a transparent material, such as clear silicone.

Figure 8A:
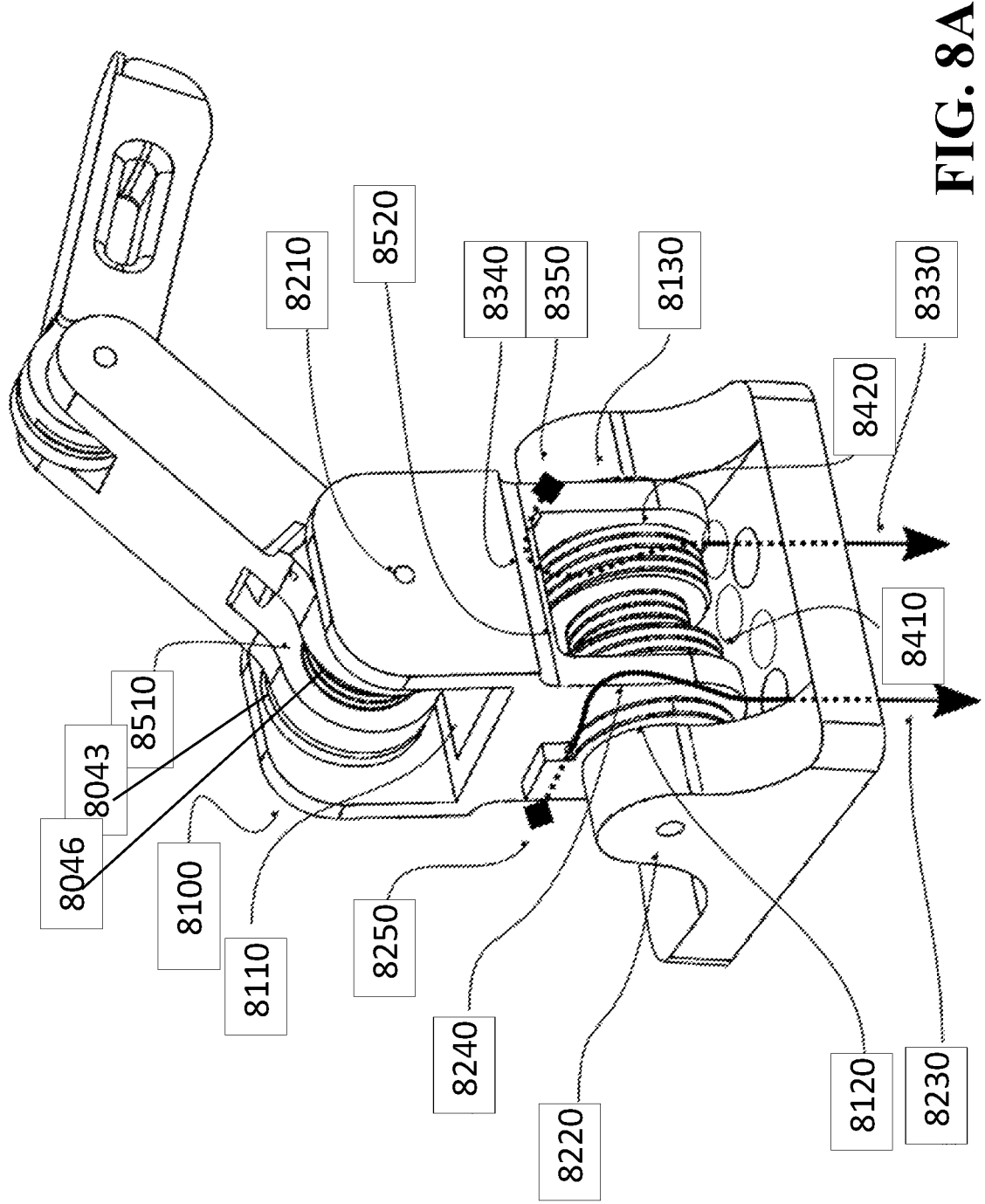
FIG. 8A is a schematic illustrating use of a phalange with nonparallel input and output axes, according to some embodiments of the present disclosure.

FIG. 8A is a schematic illustrating use of a phalange with nonparallel input and output axes, according to some embodiments of the present disclosure. Nonparallel phalange 8100 has perpendicular axes of rotation 8210 and 8220, as well as a central passage 8110.

To complete the nonparallel phalange assembly, both the standard sized helical pulleys 8410 and 8420 and a smaller size helical pulley 8510 and 8520 are employed.

Still referring to FIG. 8A, for clarity, we note that the nonparallel phalange 8100 has circular grooves for cable actuation 8120 and 8130 around axis 8220 in a way identical to proximal phalange 8040 with circular section 8030 and circular grooves 8043 and 8046.

The clockwise actuation around axis 8220 is performed by cable 8230 which wraps 8240 counterclockwise into groove 8120 and is secured at 8250 by a setscrew, compression sleeve, or the cast cable termination.

Still referring to FIG. 8A, the counterclockwise actuation around axis 8220 is performed by cable 5330 which wraps 8340 clockwise into groove 8130 and is secured at 8350 by a setscrew, compression sleeve, or the cast cable termination.

Thus, nonparallel phalange 8100 can be rotated around the lower axle 8220 by inverse twinned cables 8230 and 8330, and as nonparallel phalange 8100 rotates, it carries all further phalanges in this rotary motion.

Contemplated is that the robot gripper of FIG. 8A can include at least one gripper of an assembly configured to perform motions via actuation of independent cable ends of a plurality of cables. Wherein the at least one gripper is actuated by a pair of cables, a cable of the pair slides in a flexible sheath when actuated by a motor, moving the gripper in an opposite direction of another cable of the pair also in a flexible sheath, providing equal motions of each cable in the pair in opposite directions. Such that the pairs of cables operating the at least one gripper are directed around a joint between segments via helical pulleys, the helical pulleys include a groove structure that is u-shaped grooves. A motor assembly including at least one motor is mounted at a location separate from the assembly with the flexible sheathing extending between the assemblies. Such that the separate assembly mounting arrangement provides for maintaining a ratio between an applied force of the at least one gripper against an object to an overall mass of the assembly, resulting in improving an overall performance of the robot gripper.

Figure 8B:
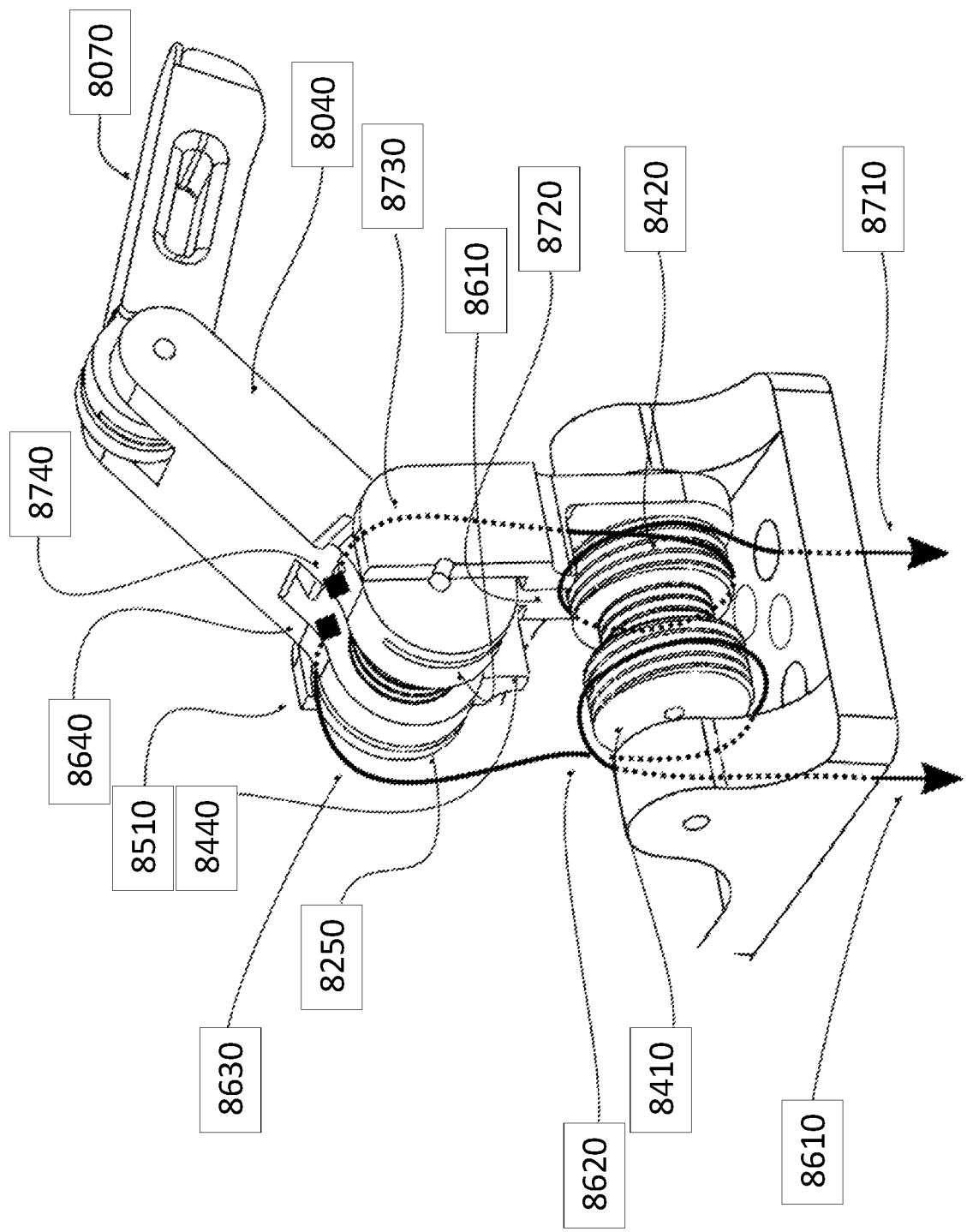
FIG. 8B is a schematic illustrating how nonparallel phalange, shown in cross section, can be cabled to move proximal phalange using helical pulleys, according to some embodiments of the present disclosure.

FIG. 8B is a schematic illustrating how nonparallel phalange 8100, here shown in cross section, can be cabled to move proximal phalange 8040 using helical pulleys 8410 and 8420, according to some embodiments of the present disclosure.

Cable 8610 exits the cable sheath and wraps 8620 around helical pulley 8410 approximately one full turn, and then proceeds upward through central passage 8110 to wrap 8630 into circular groove 8043 of proximal phalange 8040 and then is secured at 8640 by a setscrew, compression sleeve, or cast cable termination.

Still referring to FIG. 8B, cable 8710, the reverse twin of cable 8610, exits the cable sheath and wraps 8720 around helical pulley 8420 approximately one full turn, and then proceeds upward through central passage 8110 to wrap 8730 into groove 8046 of proximal phalange 8040, and is then secured at 8740 by a setscrew, compression sleeve, or cast cable termination.

Despite appearances to the contrary and as-drawn large, looping cable paths taken to make FIG. 8B more legible, cables 8610 and 8710 do not touch the interior of central passage 8110.

Still referring to FIG. 8B, it can be seen that as long as central passage 8110 of nonparallel phalange 8100 is larger than the diameter of cables 8610 and 8710 plus the diameters of helical pulleys 8410 and 8420 when measured along the axis of shaft 8210, and larger than the diameters of cables 8610 and 8710 plus the diameters of circular grooves 8043 (see FIG. 8A) and 8046 (see FIG. 8A) as measured along the axis of shaft 8220, there is adequate space for cables 8610 and 8710 pass freely through the central passage 8110 of nonparallel phalange 8100. In particular, using the diameters of both the circular grooves and helical pulleys of 25 mm, a 29 mm central passage affords adequate clearance that cables 8610 and 8710 do not touch the central passage 8110 walls at all.

Figure 8C:
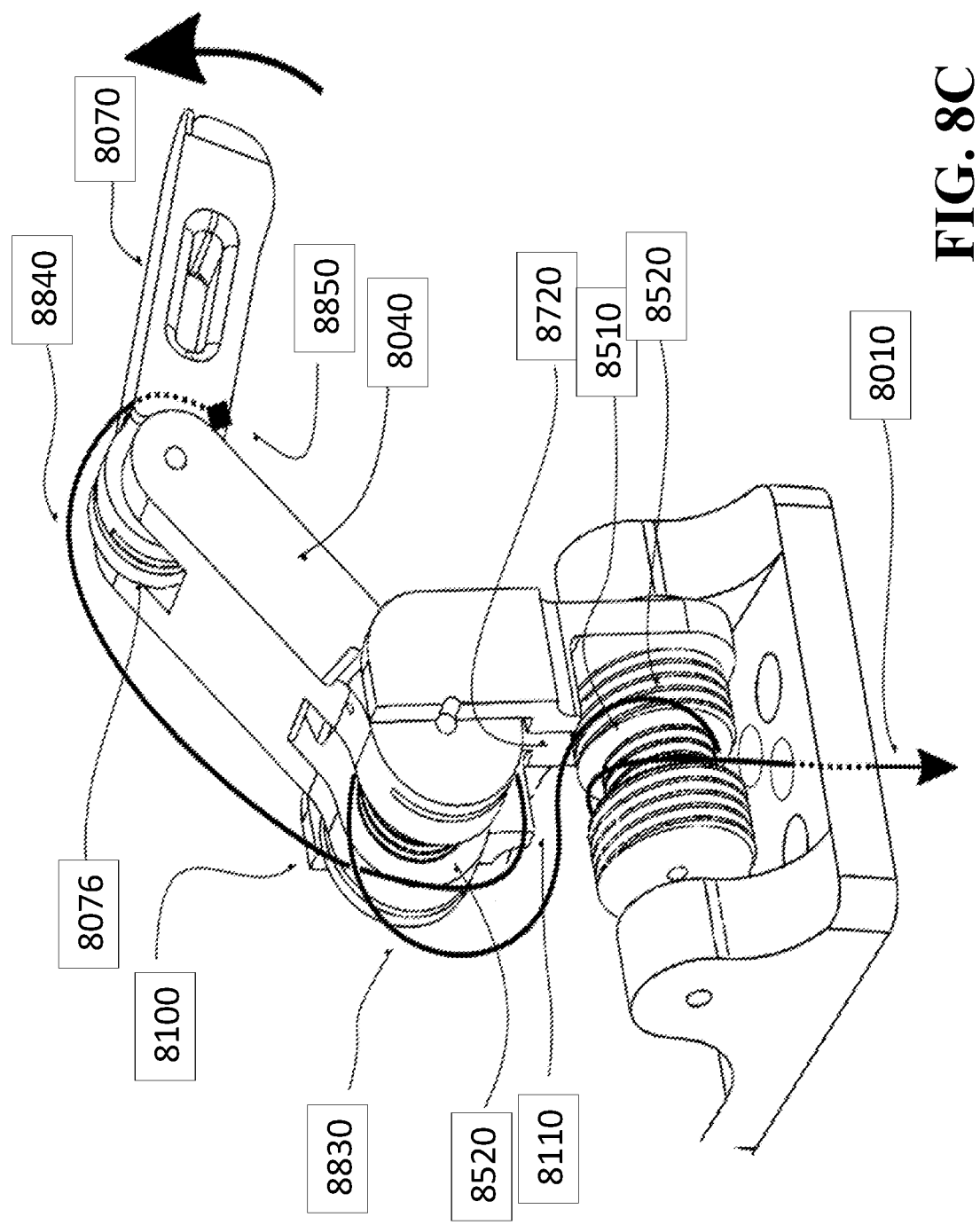
FIG. 8C is a schematic illustrating how the nonparallel phalange, shown in cross section and proximal phalange can be cabled to allow reverse twin motion, control, and feedback of distal phalange into nominal "extension", according to some embodiments of the present disclosure.

FIG. 8C is a schematic illustrating how the nonparallel phalange 8100 shown in cross section and proximal phalange 8040 can be cabled to allow reverse twin motion, control, and feedback of distal phalange 8070 into nominal "extension", according to some embodiments of the present disclosure. The cabling method described herein is analogous to the prior alternate cabling system described in FIG. 6B that does not use the internal passages of proximal phalange 8040, but that cabling could be used interchangeably here as well.

Cable 8810 exits the cable sheath and wraps 8820 around small helical pulley 8510 approximately one full turn counterclockwise, then proceeds upward through central passage 8110 to wrap 8830 approximately one full turn clockwise around small helical pulley 8520, then proceeds to wrap 8840 into distal phalange circular groove 8076 and is then secured at 8850 by a setscrew, compression sleeve, or cast cable termination.

Figure 8D:
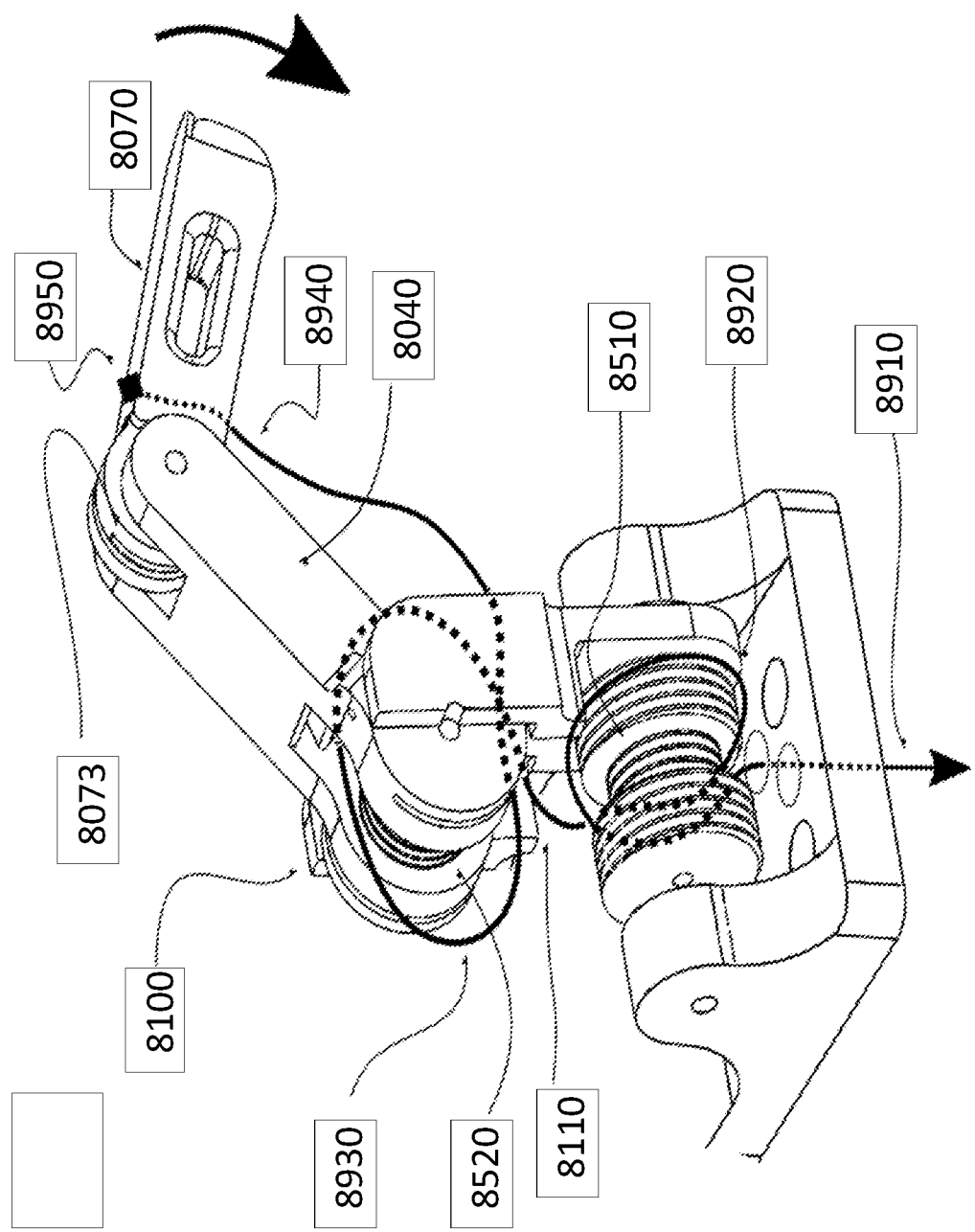
FIG. 8D is a schematic illustrating how the nonparallel phalange shown in cross section and proximal phalange can be cabled to allow reverse twin motion, control, and position feedback of distal phalange into nominal "flexion" motion, according to some embodiments of the present disclosure.

FIG. 8D is a schematic illustrating how the nonparallel phalange 8100 shown in cross section and proximal phalange 8040 can be cabled to allow reverse twin motion, control, and position feedback of distal phalange 8070 into nominal "flexion" motion, according to some embodiments of the present disclosure.

Cable 8910 exits the cable sheath and wraps 8929 around small helical pulley 8510 approximately one full turn clockwise (thus it's motion will be in agreement with reverse twin cable 8810), then proceeds upward through central passage 8110 to wrap 8930 approximately one full turn counter-clockwise around small helical pulley 8520, then proceeds to wrap 8840 into distal phalange circular groove 8073 and is then secured at 8950 by a setscrew, compression sleeve, or cast cable termination.

Still referring to FIG. 8D, thus it can be seen how the motions of reverse twinned cable pair 8230 and 8330, pair 8610 and 8710, and pair 8810 and 8910 can actuate motion of nonparallel phalange 8100, proximal phalange 1040, and distal phalange 8070. While it is true that motion of one phalange can cause either parallel or reverse motion in more distal phalanges, this motion can be calculated by pure kinematic principles and compensated for in the commands sent to servomotors 4 of FIG. 1

Further, the motions of the reverse twinned cable pair 8230 and 8330, pair 8610 and 8710, and pair 8810 and 8910 are all "equal and opposite", thus, no slack or over tension will be produced by any motion of any cable pair, nor by the position of any phalange.

Still referring to FIG. 8D, with the motions and descriptions shown, it is possible to see that nonparallel phalange 8100, proximal phalange 8040, and distal phalange 8070 emulate some major behaviors and flexibilities of the human thumb (anatomically the "mobile metacarpus" joint of the thumb).

It should also be clear that no specific limitation exists to how many nonparallel 8100 or proximal 8040 phalanges, each equipped with helical pulleys 8100 may be placed in the sequence of a gripper finger. The only concern is that central passage 8110 be large enough to accommodate all of the cables, either by direct path to the helical pulleys 8100, or by using secondary pulleys of conventional design and less than 180 degrees of wrap to place the cables into alignment the helical pulleys.

Still referring to FIG. 8D, it is also possible to compose a finger under this invention using no proximal phalanges 8040 at all, merely zero or more nonparallel phalanges 8100 followed by a distal phalange 8070.

Figure 8E:
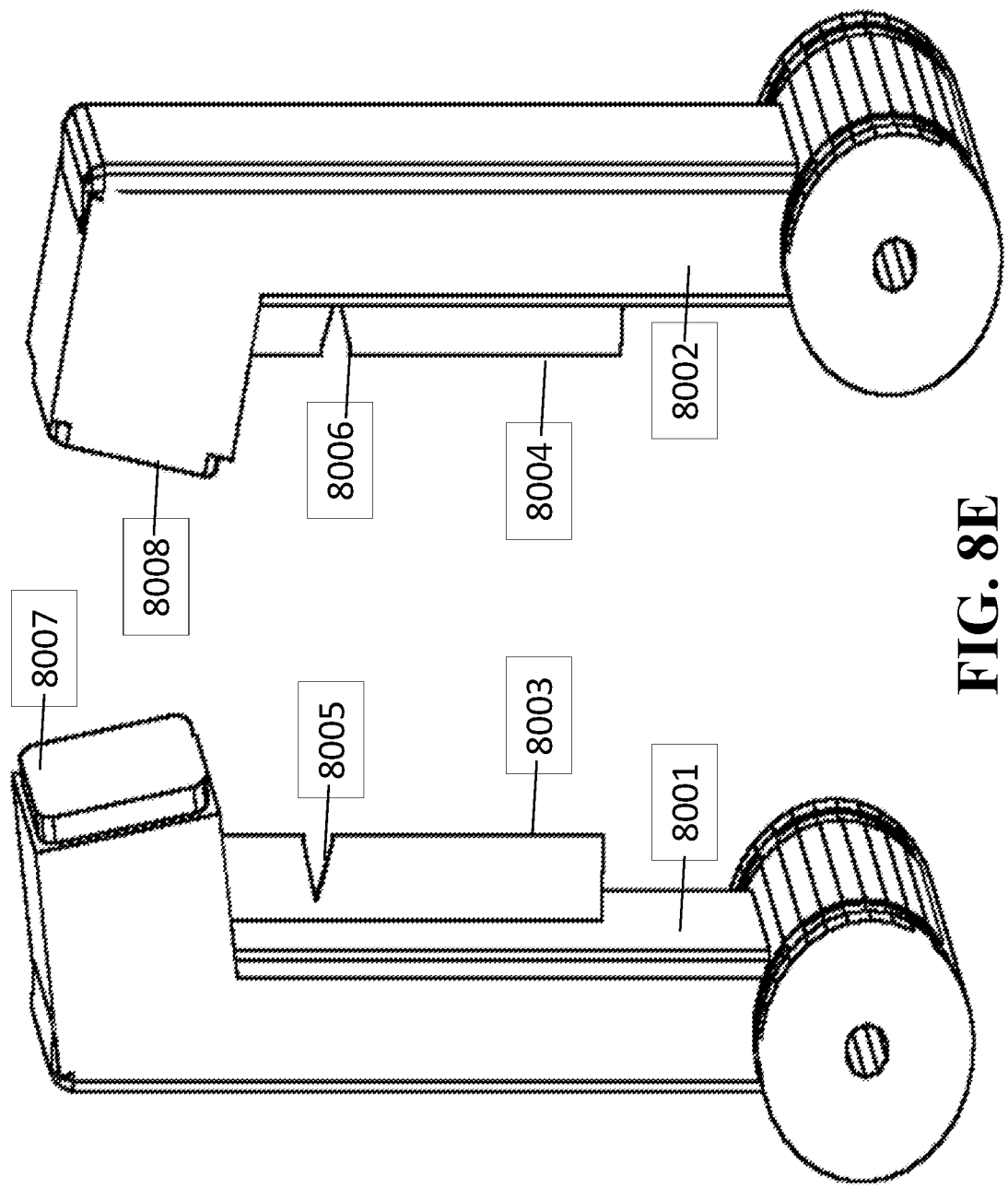
FIG. 8E is a is a schematic illustrating gripper phalanges with integrated tooling, such as nut-holding magnets, wire-cuttting blades and wire insulation removal notches, according to some embodiments of the present disclosure.

FIG. 8E is a schematic illustrating a fingers that can be part of a three-segment gripper version of the endpoint gripping assembly arranged as fingerlike as a human, according to some embodiments of the present disclosure. For example, an alternate embodiment of a finger distal phalange, illustrates the phalange pair 8001, 8002 as identical, but nothing in the present disclosure requires this feature. It is contemplated that the phalange pair can be not identical, wherein one may incorporate features that the other doesn't not include, of course, such limitations will depend upon a specific application.

Other features of the phalange pair 8001, 8002 can include a knife edge 8003, 8004, for example, in this embodiment, the knife edge 8003, 8004 includes a wire-stripping notch 8005, 8006, which it is contemplated other features could be incorporated replacing or in combination with the wire-stripping notch 8005, 8006. Also illustrated is that the phalange pair 8001, 8002 can include for the upper part of each phalange a high-stiffness elastomer pad(s) 8007, 8008, suitable for gripping and moving objects, or a magnetic section, especially useful for holding nuts for initial threading. Further, it is contemplated that the remaining design of the phalange (axis, cable slots) may be as presented before.

Still referring to FIG. 8E, if this finger like structure were to be employed on a conventional robot gripper, the knife edge 8003, 8004 and wire strippers 8005, 8006 could not be used. However, because the structure and other aspects of the present disclosure, allows for, by non-limiting example, different phalanges to have different angles and positions with respect to the phalanges of other fingers on the same gripper, the elastomer pad 8007, 8008 may be brought into opposition with the other elastomer pad 8007, 8008 (to grasp a wire), then into opposition with the cutting edge 8003, 8004 (to cut the wire), and finally into opposition with the wire-stripping notch 8005, 8006 (to strip the insulation from the wire).

Alternatively, a modified elastomer pad (not shown) may have an embedded pressure based sensor in a back portion of the modified elastomer pad. Wherein pressure exerted by an object onto the modified elastomer pad, can be measured by the opposing pressure on the modified elastomer pad onto the pressure based sensor. Thus, by measuring the deflection of the pressure based sensor, it is possible to determine a tension on the modified elastomer pad, and thus a force exerted at the fingertip or the outer surface of the modified elastomer pad.

Figure 8F:
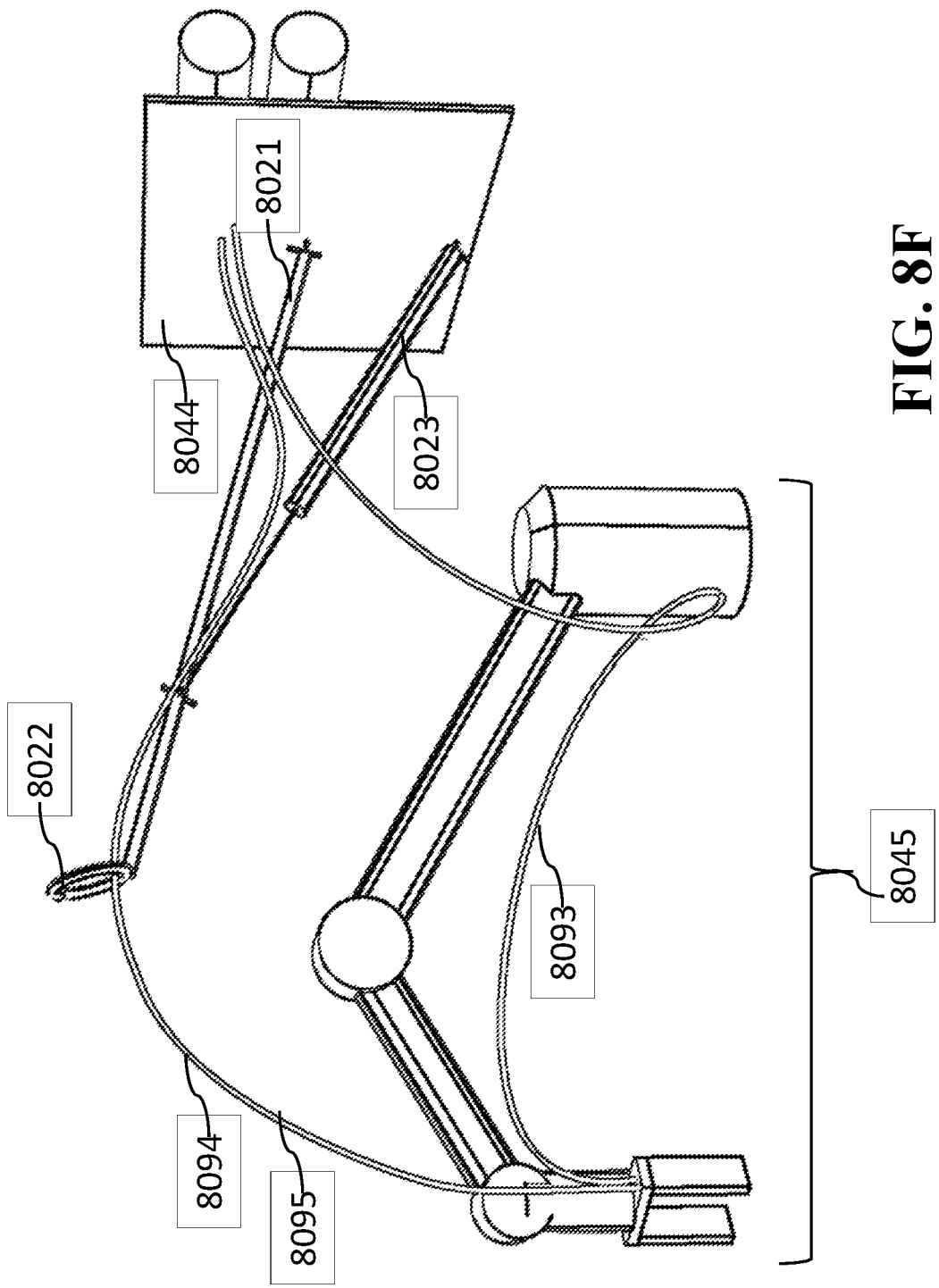
FIG. 8F is a schematic illustrating another three-segment gripper version of the endpoint gripping assembly arranged as fingerlike as a human, that incorporates a jib arm, according to some embodiments of the present disclosure.

FIG. 8F is a schematic illustrating another three-segment gripper version of the endpoint gripping assembly arranged as fingerlike as a human, that incorporates a jib arm, according to some embodiments of the present disclosure. For example, FIG. 8F shows a long-reach robot equipped with the gripper (shown only in rough view), with the addition of an additional cable support, attached to a jib arm 8021. The jib arm 8021 is hinged to rotate left and right horizontally, as well as rise up and down and is adjustable extending forward or retract. The cable 8094 and cable casings 8095 pass through a low friction cable retainer or "fairlead" 8022 of the jib arm 8021, here shown as a polymer torus. The cable retainer 8022 may optionally be made of a low friction material such as Delrin or Teflon, or optionally may be equipped with common pulleys to minimize flex, or optionally may include a cable saddle to distribute the working load.

A gas spring 8023 supports the weight of the jib arm 8021, cable retainer 8022, and most of the weight of the cables 8094 and cable casings 8095, while providing elasticity for the robot to move freely. Extremely long reach robots may need a two-part swing arm so that the length as well as the height and horizontal angle can be varied elastically, as needed.

Still referring to FIG. 8F, FIG. 8F shows two cables, lower cable 8093, not supported by the jib arm 8021, which is shown to be susceptible to being kinked and drags, resulting in degrading an overall performance of the gripper assembly.

The gripper assembly structured with the upper cable 8094, and supported by the jib arm 8021, is relatively straight and safe from entanglement. Some benefits of having the jib arm and related features can include, by non-limiting example:

(1) Long reach robots may have long cables and cable casings, wherein the long cable casings can be susceptible to kinking or dragging on a working surface of the robot. Further, the lower cable 8093 is shown as not supported by the jib arm 8021, illustrating some of the potential problems, which the jib arm 8021. In contrast, upper cable 8094 is provided with additional support by the jib arm 8021 and cable retainer 8022, keeping the upper cable 8022 from the problems like kinking, dragging, or becoming entangled in the work piece;

(2) The jib arm 8021 also reduces friction by decreasing the number of friction-causing wraps the cable 8094 can encounter between the servomotor assembly 8044 and the actual gripper assembly 8045. For example, within the gripper assembly 8045, there are helical pulleys that provide very low friction, however, at least one goal of the present disclosure is to minimize cable friction as most as possible, which is valuable benefit, because less cable friction enhances the gripper performance as well as increase the life of cable working life. As cable friction follows Eytelwein's rule, which states that relative friction between a rope and a wrapped object is exponential in both the coefficient of friction and the number of wraps, keeping the cable 8094 and cable casings 8095 as straight as possible minimizes friction exponentially.

Still referring to FIG. 8F, in extreme cases where absolute minimum mass loadings of the robot arm are required (for ultra-high precision work) gripper ferrules (not shown here for clarity, please see FIG. 9) may be equipped with strain gauges, and the jib arm 8021 gas spring 8023 be replaced with a servo drive (not shown). A controller (not shown) can then operate the jib arm 8021 servo drives to zero out all forces on the gripper head exerted by the cables 8094 and cable casings 9095 as they enter the gripper.

Figure 9:
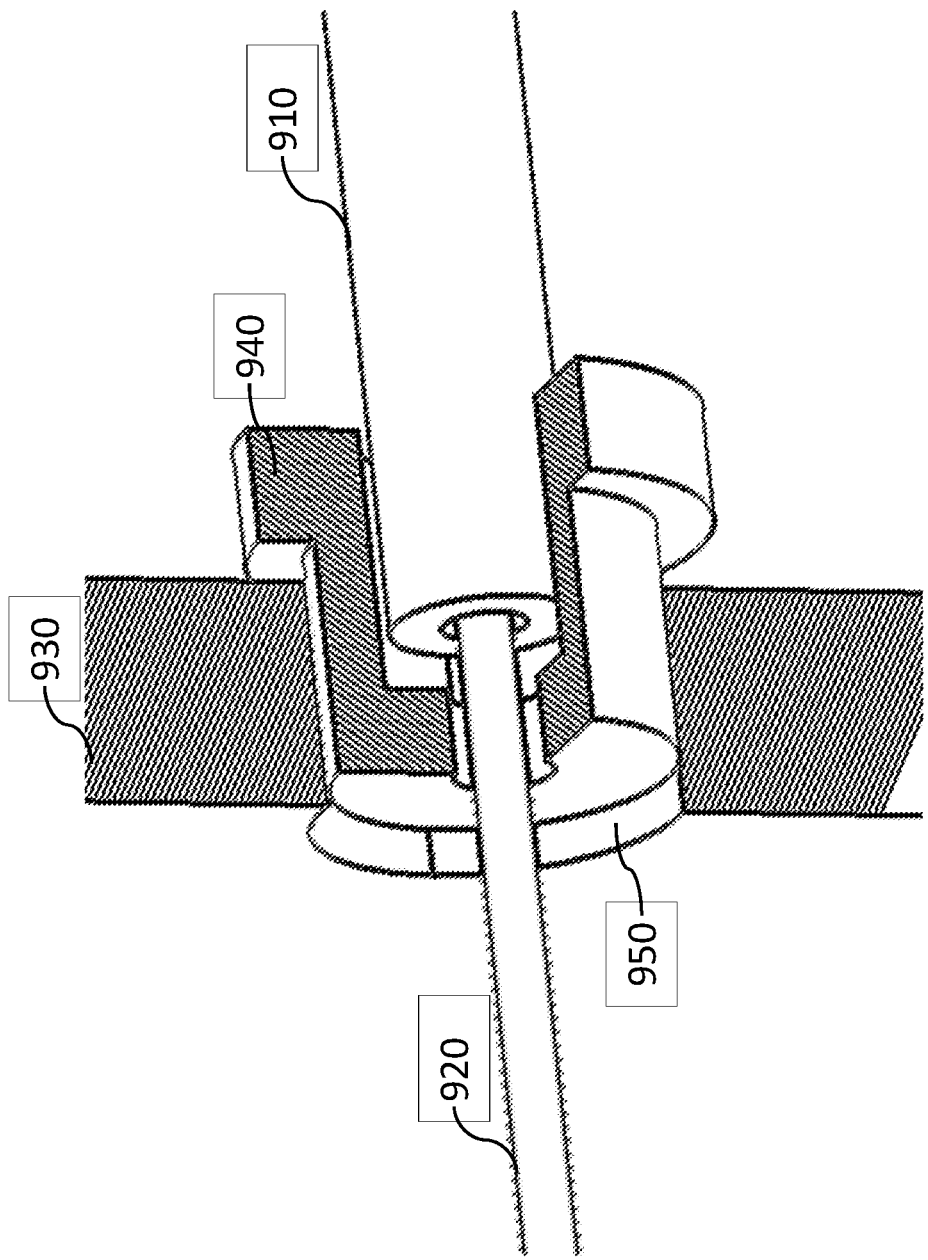
FIG. 9 is a schematic illustrating some fastening features of the flexible sheathing to the motor and gripper assemblies, according to embodiments of the present disclosure.

FIG. 9 is a schematic illustrating some fastening features of the flexible sheathing to the motor and gripper assemblies, according to embodiments of the present disclosure. For example, FIG. 9 illustrates the cable structure and attachment configuration, wherein the flexible sheathing 910 covers the cable 920 up to a hole 950 area of an assembly 930, i.e. motor assembly or gripper assembly, such that the flexible sheathing 910 ends approximate the hole 920, either in the hole 920 or approximate an outer surface of the assembly 930. Wherein a grommet 940 is sized and configured to accept an end of the flexible sheathing 910, securing the flexible sheathing 910, so as to allow the cable 920 to further extend uncovered by the flexible sheathing 910, through the grommet 940 and through the hole 950 of the assembly 930.

Considered during experimentation was a flexible sheathing having proximal end that had consecutive multiple flexible or resilient portions, each flexible portion could move independently of the other flexible portions. A flexible portion of the proximal end was connected to a distal portion which was rigid or had a fixed configuration that extended to another assembly, different than the assembly the proximal end was connected. Wherein the proximal portion with the consecutive multiple flexible portions was covered in an outer tube, i.e. covering the multiple flexible portions up to or including a portion of the distal end. Such that the outer tube was fabricated from a suitable material which was not axially compressible or extensible.

In the context of the set of flexible reverse twinned cables (see FIG. 1, cables 2), these cables are covered or positioned within flexible sheaths, which connect the gripper endpoint assembly (see FIG. 1, gripper endpoint assembly 1) to the motor mount assembly (see FIG. 1, motor mount assembly 3). The motor mount assembly contains as many servo motors (see FIG. 1, servo motors 4), as needed to actuate each remote degree of freedom in the gripper endpoint assembly 1. As noted above some embodiments of the present disclosure can include the reverse twinned cables that are made from bicycle brake cables, but any similar tension-preserving cables with outer sheaths (shifter cable, motorcycle throttle, brake, or clutch cable) will function.

Still referring to FIG. 9, by non-limiting example, and depending upon the particular application, the flexible sheaths 910 can have a diameter of 3.5 mm, wherein the cable 920 diameter can be 0.7 mm made of material that can be a high tension steal. Also, as an example, the flexible sheathing 910 can be rotatably and slidably extending over each cable 920 and is a material capable of transmitting axial tensile forces, compressive forces, torsional forces and rotational forces. For example, the flexible sheathing 910 can be non-radially expandable, or the like, such that the flexible sheathing 910 can function to ensure that actuation of the cables 920 solely translate in an axial direction and do not deflect radially outward. Each actuation cable 920 may be fabricated from a suitable material, i.e., stainless steel, capable of transmitting axial and torsional forces, compressive forces, along with torsional forces and rotational forces.

Other aspects of the flexible sheathing 910 can include the flexible sheathing 910 having a constant length path for the flexible cables 920 between a base of the gripper assembly to a base of the remotely mounted motor assembly, i.e. assembly 930 of FIG. 9.

Still referring to FIG. 9, through experimentation, while testing several cable guide structural configurations, lessons were eventually learned resulting in the present structural configuration of the present disclosure that best addresses most of performance goals regarding cable translation of the present disclosure (see FIG. 9). Gleaned from these experiments is that a cable guide structural arrangement, at first glance, it would seem that adding segments of completely straight and rigid cable guides could result in an even lower total wrap angle (and thus according to Eytelwein's approximation), lower total friction. For example, regarding robotic applications, having larger diameter (and therefore lower-angle) bends, can result in a lower total wrap angle and thus lower friction. However, learned from experimentation, is that this is an approximation and not always the case. Under extreme (a typical) robotic conditions, say, long-range teleoperation in situations such as HAZMAT or nuclear reactor decommissioning, such long straight rigid sections (or even open-cable sections, with end ferrules and intermediate support pulleys, if needed) may be useful. Because the present disclosure places zero radiation-sensitive, water-sensitive, and electromagnetic-field sensitive electronics at the gripper, the embodiments of the present disclosure have unique advantages and benefits in such hostile environments, especially when combined with a zero-electronics flexible fiber-optic borescope or GRIN (Gradient Index) borescope to provide visual imaging to an operator (whether human or silicon) safely outside of the danger area.

Contemplated is that grommet 940 may screw into the assembly hole 950 fixing the grommet 940 to the assembly hole 950. Also contemplated is that the grommet 940 can include a screw portion on a collar that may fixedly attached to the flexible sheathing 910, wherein the cable 920 passes freely through the hole 950 of the assembly 930.

Still referring to FIG. 9, it is possible that the flexible sheathing 910 can rotatably and slidably extend over the cable 920, such that the cable 920 can be fabricated from a type of material capable of transmitting axial tensile and compressive forces, and torsional or rotational forces. Also, the flexible sheathing 910 can be fabricated from a type of material also capable of transmitting axial tensile and compressive forces, and torsional or rotational forces.

It is also possible for grommet 940 to be equipped with a sensor such as a strain gauge to measure the at-site tension of cable 920; such a strain gauge might be measuring the extensional strain of grommet 940 between the interface of assembly 930 and grommet 940, as placed under tension by forces at the interface between grommet 940 and cable 910. Other configurations of force detection are also possible at the grommet 940.

Figure 10A:
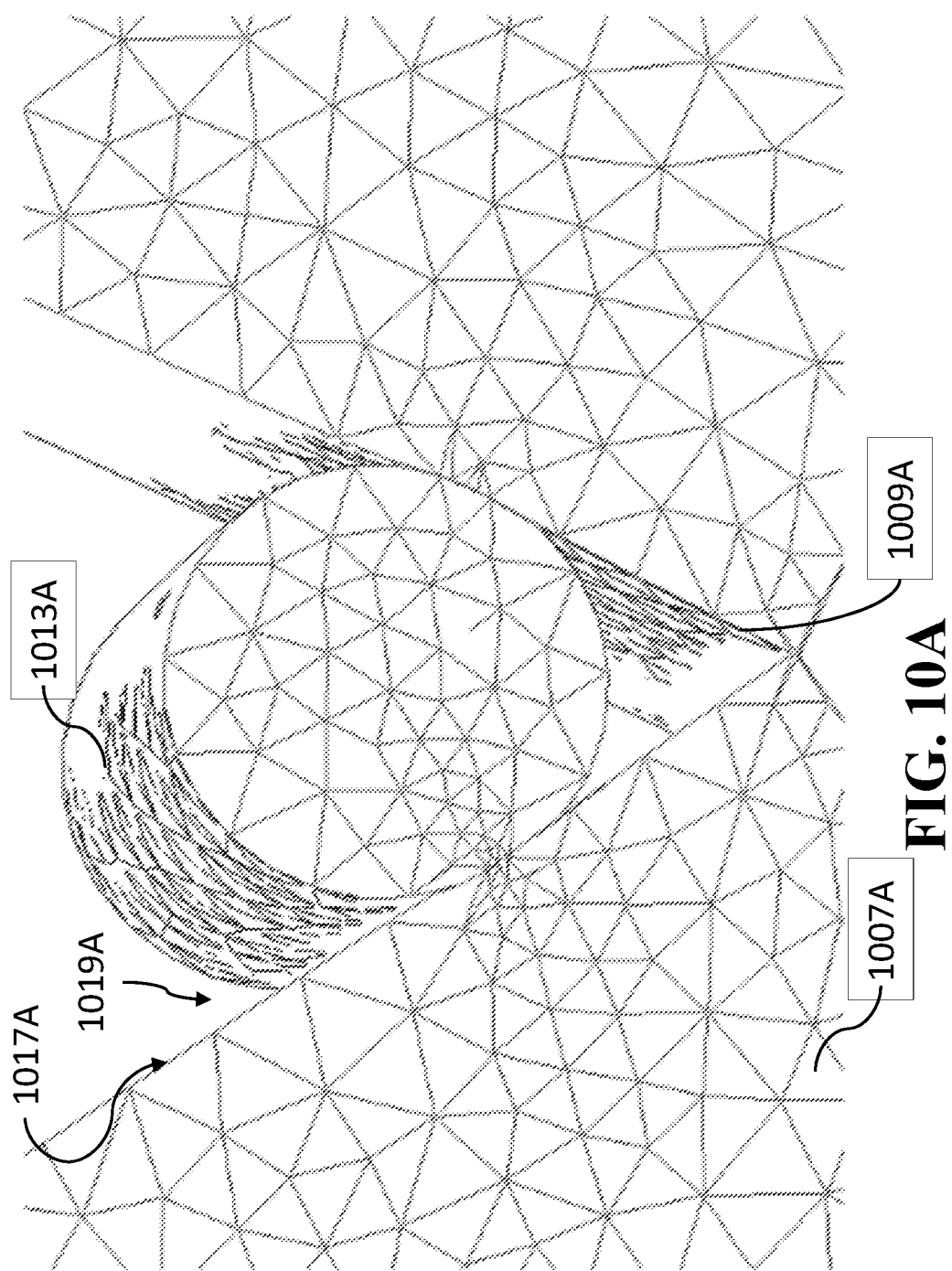
FIG. 10A is a schematic illustrating groove features of a helical pulley, according to embodiments of the present disclosure.

FIG. 10A is a schematic illustrating groove features of the helical pulley, according to embodiments of the present disclosure. For example, FIG. 10A shows the cable 1013A positioned in a groove 1009A of the helical pulley 1007A, wherein there is a portion 1017A of the structure of the groove 1009A extends away from the cable 1013A of the helical pulley 1007A. Wherein there is a gap 1019A between the cable 1013A and the groove 1009A of the helical pulley 1007A.

As an operational perspective, the helical pulley can have multiple wraps (about 360 degrees of wrap 1720 wrap (see FIG. 5B), plus/minus angle of phalange) around the helical pulley without causing friction, yet maintain cable tension, compressive force (possible ball bearing) to provide support without wedging and jamming. For example, FIG. 10A shows that the helical pulley has been modified, wherein the conventional helical pulley groove is "V-shaped", the present disclosure illustrates a groove that is "U-shaped".

Still referring to FIG. 10A, realized from experimentation, is that the specific shape of the pulley groove 1009A itself is significant. Finite Element Modeling (FEM) of the cable in groove's stresses shows that simple changes can reduce the cable stress by a factor of over three. For example, FIG. 10A shows the groove 1009A having an approximate 60-degree groove angle, such as can be cut by a thread cutting machine. The FEM showed a peak Von Mises stress of 1447 MPa at a cable loading of 10000 Nt and a 4 mm nominal cable diameter.

Figure 10B:
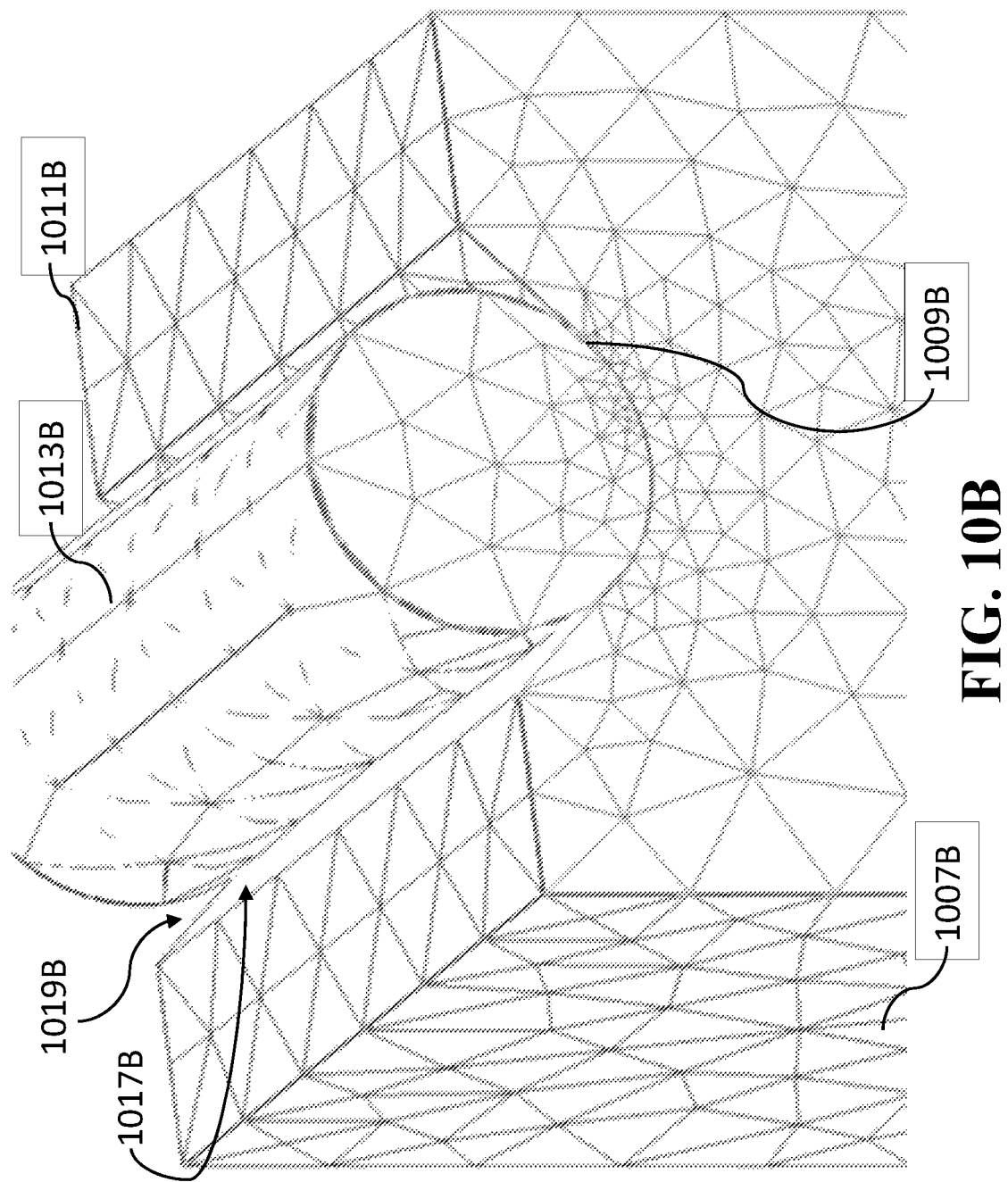
FIG. 10B is a schematic illustrating other groove features of the helical pulley, according to embodiments of the present disclosure.

FIG. 10B is a schematic illustrating other groove features of the helical pulley, according to embodiments of the present disclosure. For example, FIG. 10B shows the cable 1013B positioned in a groove 1009B of the helical pulley 1007B, wherein there is a portion 1017B of the structure of the groove 1009B extends away from the cable 1013B at an additional degrees and then extending to a top surface 1011B of the helical pulley 1007B. Wherein there is a gap 1019B between the cable 1013A and the groove 1009B of the helical pulley 1007B.

Tested during experimentation is the angling of the groove, such that what was realized is that a round bottom groove extended with 45 degree chamfers of FIG. 10B is better that the configuration of FIG. 10A, wherein FIG. 10B has a maximum Von Mises stress of 792 MPa with the same size cable and loading as FIG. 10A. Further, a 60-degree wrap groove with rounded chamfers (FIG. 10A) further diminishes the maximum Von Mises stress to 770 MPa with the same size cable and loading.

Figure 10C:
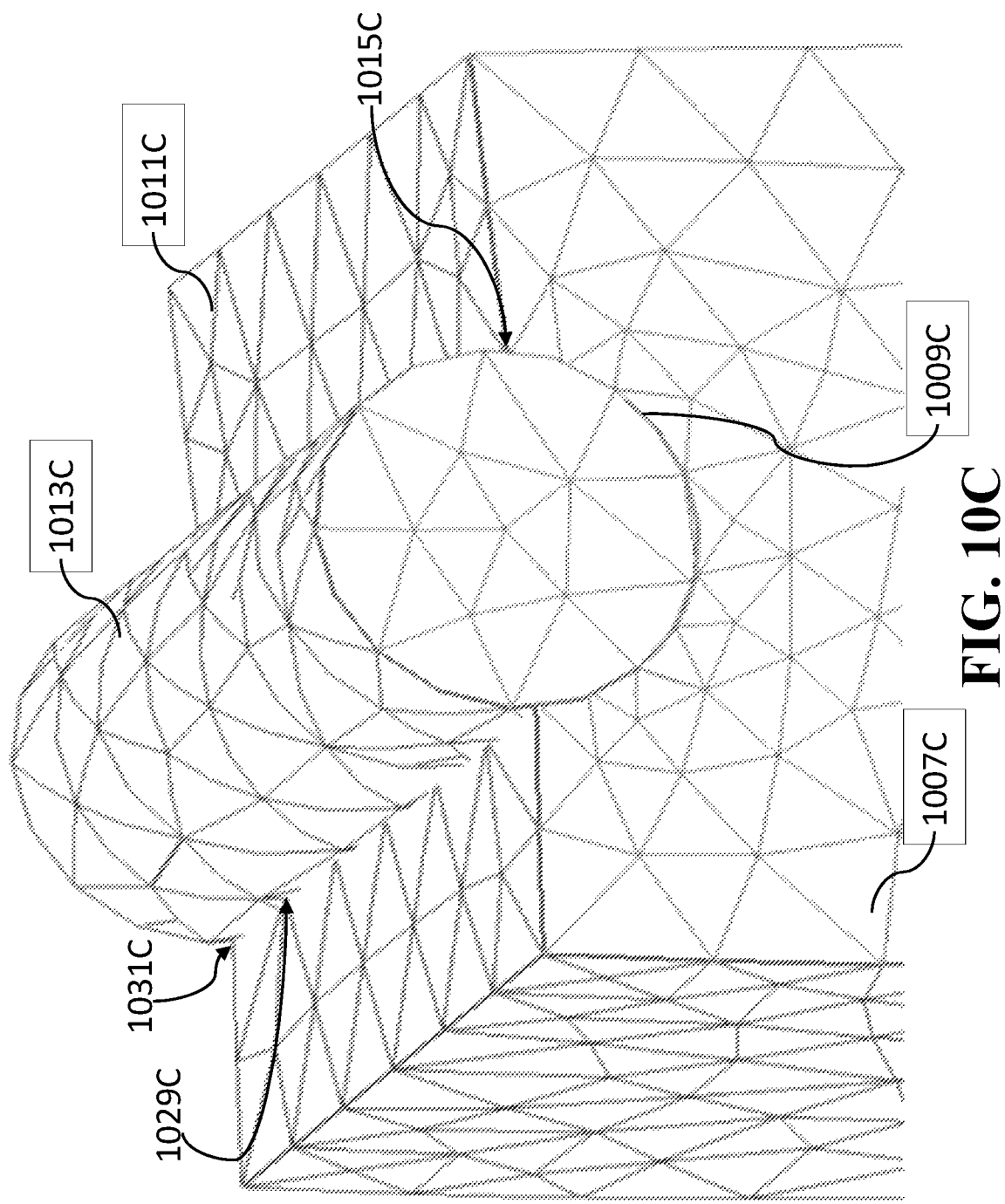
FIG. 10C is a schematic illustrating some another groove features of the helical pulley, according to embodiments of the present disclosure.

FIG. 10C is a schematic illustrating another groove feature of the helical pulley, according to embodiments of the present disclosure. For example, FIG. 10C shows the cable 1013C positioned in a groove 1009C of the helical pulley 1007C, wherein there is "no" portion 1029C of the structure of the groove 1009C that extends away from the cable 1013C approximate a top surface 1011C of the helical pulley 1007C. Notes is that is "no" gap 1031C between the cable 1013C and the groove 1009C of the helical pulley 1007C.

FIG. 10C shows that a matched-profile groove of the cable 1013C with nearly 180 degrees of support provides the lowest peak Von Mises stress, with only 422 MPa with the same size cable 1013C.

Features

A robot gripper, including at least two grippers of a grasper assembly configured to perform grasping motions via actuation of independent cable ends of a plurality of cables, and configured to move toward or away from each other to perform the grasping motion. Wherein each gripper is actuated by a pair of cables, a cable of the pair slides in a flexible sheath when actuated by a motor, moving the gripper in an opposite direction of another cable of the pair also in a flexible sheath, providing equal motions of each cable in the pair in opposite directions. A motor assembly including the motors is mounted at a location separate from the grasper assembly with the flexible sheathing extending between the assemblies. Such that the separate assembly mounting arrangement provides for maintaining a ratio between a gripping force of the grippers to an overall mass of the grasper assembly, resulting in improving an overall performance of the robot gripper. Contemplated is that the robot gripper, can include any combination of the different aspects listed below.

An aspect of the robot gripper can include the paired cables wound in opposite directions around a helical windlass driven by the motor.

Another aspect of the robot gripper can include the helical windlass having a u-shaped groove. Wherein an aspect may be that the u-shaped groove includes a groove structure that is a matched-profiled groove structure of the cable in the pair of cables. Another aspect may be that the u-shaped groove separates turns of each cable, so an entry and an exit of the cable never rubs or overwraps, even when a wrap angle exceeds 720 degrees, as long as a turn-to-turn pitch of the helical pulley is larger than a diameter of the cable.

Another aspect of the robot gripper can include a single helical pulley driven by the motor provides one cable of the pair of cables, to wrap a $N^{th}$ degrees around the helical pulley, another cable of the pair of cables, to simultaneously unwrap by the $N^{th}$ degrees, resulting in a zero overall length change of the unwrapped cable, such that the unwrapped cable maintains a constant applied tension force through unwrapping action.

Another aspect of the robot gripper can include at least one gripper includes multiple segments comprising a finger like configuration, such that joints between the segments allows relative motion between the segments of the finger like configuration. Wherein an aspect maybe that the pairs of cables operating each gripper are directed around a joint between segments of the gripper via helical pulleys. Another aspect could be that the opposing cables in each cable pair wrap in opposite directions around a single helical pulley, with a wrap angle greater than 180 degrees. Another aspect could be that the opposing cables in each cable pair wrap in opposite directions around a pair of helical pulleys on a common shaft, with a wrap angle greater than 180 degrees. Further another aspect could that the helical pulley includes a single helical groove and the opposing cables in each pair wrap in opposite directions on separate regions of the helical pulley. Also, an aspect may include the helical pulley having a pair of helical grooves interlaced on a winding surface with approximately 180 degrees' pitch angle between the helical grooves, and the opposing cables in each pair wrap in opposite directions in overlapping regions of the helical pulley.

Another aspect of the robot gripper can include at least one motor is a servomotor or all the motors are servomotors. Wherein the servomotors give force feedback to a controlling processor. Wherein the servomotors are programmable as to compliance of, a maximum speed, a maximum torque, a predetermined speed, a predetermined torque, an integration of control parameters, an integration of a derivative loop closure or integration of other types of control like parameters.

Another aspect of the robot gripper can include a calibration block, positioned within a range of motion of at least one gripper, with the calibration block mounting equipped having a force measurement device, the calibration block and the force measurement device to detect a position and a force exerted by each segment of the gripper. Wherein the position and the force exerted by a segment of the gripper against the calibration block is used to calibrate a motor position and a cable system hysteresis and a cable system friction.

Another aspect of the robot gripper at least one cable of the pair of cables is associated with a jib arm, the at least one pass through a low friction cable retainer of the jib arm, such that jib arm is hinged to rotate left and right horizontally, as well as rise up and down vertically.

A robot end effector, including at least two grippers of a grasper assembly configured to perform grasping motions via actuation of independent cable ends of a plurality of cables, and configured to move toward or away from each other to perform the grasping motion. Wherein each gripper is actuated by a pair of cables in flexible sheathing connected to a motor, moving the gripper in an opposite direction of an other cable of the pair, providing equal motions of each cable in the pair in opposite directions. Such that the pairs of cables operating each gripper are directed around a joint between segments via helical pulleys. A motor assembly including the motors is mounted at a location separate from the grasper assembly with the flexible sheathing extending between the assemblies. Such that the separate assembly mounting arrangement provides for maintaining a ratio between a gripping force of the grippers to an overall mass of the grasper assembly, resulting in improving an overall performance of the robot gripper. Contemplated is that the robot gripper, can include any combination of the different aspects listed below.

An aspect of the robot gripper can include at least one gripper includes multiple segments comprising a finger like configuration, such that joints between the segments allows relative motion between the segments of the finger like configuration, and that the pairs of cables operating each gripper are directed around a joint between segments of the gripper via helical pulleys, such that the opposing cables in each cable pair wrap in opposite directions around a single helical pulley having u-shaped grooves, with a wrap angle greater than 180 degrees.

A robotic prehension device, including at least two claws of a gripper assembly configured to perform gripping motions via actuation of independent cable ends of a plurality of cables, and configured to move toward or away from each other to perform the gripping motion. Wherein each claw is actuated by a pair of cables in flexible sheathing connected to a motor, the flexible sheathing is rotatably and slidably extending over each cable and capable of withstanding forces. Such that the pairs of cables operating each claw are directed around a joint between segments of each claw via helical pulleys, and the opposing cables in each cable pair wrap in opposite directions around a single helical pulley, with a wrap angle greater than 180 degrees. A motor assembly including the motors is mounted at a location separate from the gripper assembly with the flexible sheathing extending between the assemblies. Such that the separate assembly mounting arrangement provides for maintaining a ratio between a gripping force of the claws to an overall mass of the gripper assembly, resulting in improving an overall performance of the robot prehension device. Contemplated is that the robot gripper, can include any combination of the different aspects listed below.

An aspect of the robot gripper can include the helical pulleys includes u-shaped grooves, such that a groove structure of each u-shaped groove is a matched-profiled groove structure of the cable in the pair of cables.

Advantages and Technical Features & Benefits

Some advantages of the embodiments of the present disclosure include highly dexterous manipulation, due to the force feedback and high degree of freedom, as well as good positioning for optical and tactile sensors. For example, some advantages of the force feedback can reduce an operator's operation time using the gripper assembly and can enable novice operators to perform a satisfactory job, or can be an advantage when programming software for a control to conduct operations of the gripper assembly. Further, a lack of high dexterity in a gripper assembly can lead to lost operation time in completing projects/tasks, or even damage or failure in completing the operation/task, as is experienced with conventional non-dexterous grippers. Whereas, the high dexterity gripper assembly of the present disclosure helps to overcome these limitations.

Another advantage of the embodiments of the present disclosure can be that the robot arm mass loading of the gripper is very low for its force and speed, as the prime mover for each degree of freedom is not carried by the robot, but is remote with the force and force feedback carried by flexible sheathed cables.

Also another advantage of the embodiments of the present disclosure is that the end effector part does not need to contain electronics, nor in fact any requirement for metals or conductors whatsoever; a gripper according to the invention could be made purely of polycarbonate, acetal, or glass-filled nylon plastic, with nylon, aramid (Kevlar) or UHMWPE (Dyneema or Spectra) cables in UHMW sheaths and fiberglass-reinforced epoxy axles. Thus, the manipulator could be used in environments of extremely high magnetic or electric field intensity, as well as in high RF environments.

With no electronics required in the end effector whatsoever, the gripper could be used in areas of intense ionizing radiation that would destroy semiconductors.

With any of these materials (and to a lesser extent with aluminum structures, steel shafting, and steel cabling) some wear and stretch will occur. This is not desirable for continued, long term precision use of the gripper.

Therefore, an additional element of the present disclosure can be a simple calibration station, composed of a precision, preferably hardened, block of size similar to a distal phalange, equipped with a three- to six-axis force gauges, rigidly positioned at a known location in the frame of reference of the base robot, and with an optional video camera. To calibrate the robotic gripper, the gripper is positioned in front of the camera and each of the phalanges driven to approximate a calibration position with gaps between the fingers 2 to 4 times the size of the calibration block. Then, the calibration computer commands robot to move the gripper over the calibration block, and slowly drives each gripper phalange hinge point and gripping point (usually the fingernail 1080 edge and at least two points on the fingertip pad 1090) on the gripper against one of the faces of the calibration block, while monitoring the force gauges of the calibration block as well as the feedback forces reported by the gripper servo motors themselves. Preferably several levels of force in each direction of each phalange's motion should be tested. This provides absolute position referencing of the gripper and servo motor encoders into the frame of reference of the robot, confirm the frictional coefficients of the cable sheaths and the cable sheath state of wear, as well as evaluation of any wear-induced ore stretch-induced slack in the reverse twinned cables themselves, and validate the robot and gripper for continued precision use.

For ultra-precise gripping, it can be advantageous to have one or more of the gripper fingers be completely immobile and rigid with respect to the gripper-robot interface. This rigid finger is calibrated to position using the calibration block as above, and then the dexterous gripper finger or fingers grip the workpiece firmly against the calibrated rigid finger surface. As long as the workpiece is held tightly against the calibrated rigid finger surface, the position of the workpiece is known to very high precision, akin to a master machinist aligning two surfaces by pressing them both against a precision granite surface plate.

In addressing some technical attributes of the structural design of the gripper assembly, several technical attributes will be discussed. For example, FIG. 4, illustrates a pair of fingers composed of proximal phalanges 4-1-1040 and distal phalanges 4-1-1070, in 180-degree opposition. FIG. 8A is similar to the embodiment of FIG. 4, but replaces the individual two-phalange fingers with three-phalange fingers, each composed of a nonparallel phalange 8100, followed by a proximal phalange 8040 and a distal phalange 8070.

Although many would consider this additional axis "redundant" as a robot gripper, it is useful as it allows X, Y, Z translational motion and A, B, C rotational motion, all with force feedback, of the grasped object without motion of the main robot arm, which allows for a stable video camera platform, small motion control with high finesse and compliance due to the force feedback, and the ability to move in a small area or through configurations that the main robot arm cannot, such as a joint "singularity", also known as a "joint lockout". Joint singularity or joint lockout occurs whenever the desired motion puts two axes of the main robot arm parallel. The robot, thus temporarily deprived of a degree of freedom, cannot execute the requested motion even though both motion endpoints are within the reachable space.

Further, FIG. 8A can be a robotic gripper with three "thumb" fingers, each with three phalanges (nonparallel 8100, proximal 8040, and distal 8070), each placed radially (at 120 degrees) instead of the initial embodiment of two fingers placed at 180 degrees. If the three fingers are disposed radially at 120 degrees on base plate 8010, the gripper is particularly adept at grasping objects with spherical symmetry, but other general shapes (cubes, rods, etc.) can be grasped as well.

Further still, in regard to FIG. 8A, where a single "thumb" (composed of one each nonparallel 8100, proximal 1040, and distal 8070 phalanges) oppose a pair of parallel or nearly parallel "thumbs" of the same design and where the angle between the first axis of rotation 8220 of the parallel thumbs is 0 degrees or close to it. An advantage of this gripper configuration is a much stronger encircling grip for long rod like objects, retaining a strong, truly encircling grip on spheroidal objects, plus the ability do a "tweezer" grasp between the parallel thumbs, which is enhanced by replacing the symmetrical fingernail 1080 with a more extended version with side serrations, and by installing a modified rubber finger pad 8090 wherein the rubber extends to the side of the finger. Additionally, this asymmetric gripper can act as to push an object without grasping it, with all three fingers applying force (the two paralleled thumbs acting in flexion mode, and the third thumb folded between the paralleled thumbs and then bending backward so that the angle of the opposing thumb's distal phalange 8070 back surface and fingernail 8080 is the same or similar to the angle of the parallel thumbs distal phalange finger pad 8090.

Further still, FIG. 8A is similar to a human hand, where one "thumb" (composed of a nonparallel phalange 8100, proximal phalange 8040, and distal phalange 8070) are opposing a pair of parallel "fingers" (composed either of a proximal phalange 8040 with two helical pulleys 8410 and 8420, followed by a conventional proximal phalange 8040 and distal phalange 8070, or more simply of elongated versions of proximal phalange 8040 and distal phalange 8070.)

Also, in regard to FIG. 8A, it is possible to be a "tentacle finger" or "lobster arm", wherein multiple nonparallel phalanges 8100 with helical pulleys 8100 are placed in sequence and terminated by a single distal phalange 8070. Another aspect can be that FIG. 8A places two or more "thumb" configuration fingers (each one nonparallel 8100, proximal 8040, and distal 8070) around the outside of a cylinder; the hollow of the cylinder to hold cameras, illumination devices, tools, and sensors such as temperature, radiation, sound, etc.

Embodiments

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A robot gripper, comprising:
   at least two grippers of a grasper assembly configured to perform grasping motions via actuation of independent cable ends of a plurality of cables, and configured to move toward or away from each other to perform the grasping motion, wherein each gripper is actuated by a pair of cables, a cable of the pair slides in a flexible sheath when actuated by a motor, moving the gripper in an opposite direction of an other cable of the pair also in a flexible sheath, providing equal motions of each cable in the pair in opposite directions; and
   a motor assembly including the motors is mounted at a location separate from the grasper assembly with the flexible sheaths extending between the assemblies, such that a separate assembly mounting arrangement provides for maintaining a ratio between a gripping force of the grippers to an overall mass of the grasper assembly, resulting in improving an overall performance of the robot gripper, wherein at least one cable of the pair of cables passes through a low friction cable retainer of a jib arm, wherein the jib arm is hinged to rotate left and right horizontally, as well as rise up and down vertically.

2. The robot gripper of claim 1, wherein the paired cables are wound in opposite directions around a helical windlass driven by the motor.

3. The robot gripper of claim 2, wherein the helical windlass includes a u-shaped groove.

4. The robot gripper of claim 3, wherein the u-shaped groove includes a groove structure that is a matched-profiled groove structure of the cable in the pair of cables.

5. The robot gripper of claim 3, wherein u-shaped groove separates turns of each cable, so an entry and an exit of the cable never rubs or overwraps, even when a wrap angle exceeds 720 degrees, as long as a turn-to-turn pitch of the helical pulley is larger than a diameter of the cable.

6. The robot gripper of claim 1, wherein when a single helical pulley driven by the motor wraps one cable of the pair of cables around the helical pulley, the single helical pulley is configured to simultaneously unwrap another cable in the pair of cables resulting in a zero overall length change of the unwrapped cable, such that the unwrapped cable maintains a constant applied tension force through unwrapping action.

7. The robot gripper of claim 1, wherein at least one gripper includes multiple segments comprising a finger like configuration, such that joints between the segments allows relative motion between the segments of the finger like configuration.

8. The robot gripper of claim 7, wherein the pairs of cables operating each gripper are directed around a joint between segments of the gripper via helical pulleys.

9. The robot gripper of claim 8, wherein the opposing cables in each cable pair wrap in opposite directions around a single helical pulley, with a wrap angle greater than 180 degrees.

10. The robot gripper of claim 9, wherein the helical pulley includes a single helical groove and the opposing cables in each pair wrap in opposite directions on separate regions of the helical pulley.

11. The robot gripper of claim 9, wherein the helical pulley includes a pair of helical grooves interlaced on a winding surface with approximately 180 degrees pitch angle between the helical grooves, and the opposing cables in each pair wrap in opposite directions in overlapping regions of the helical pulley.

12. The robot gripper of claim 1, wherein at least one motor is a servomotor or all the motors are servomotors, such that the servomotors give force feedback to a controlling processor.

13. The robot gripper of claim 12, wherein the servomotors are programmable as to compliance of, a maximum speed, a maximum torque, a predetermined speed, a predetermined torque, an integration of control parameters, an integration of a derivative loop closure or integration of other types of control like parameters.

14. A robot gripper, comprising:
   at least one gripper of an assembly configured to perform motions via actuation of independent cable ends of a plurality of cables, wherein the at least one gripper is actuated by a pair of cables, a cable of the pair slides in a flexible sheath when actuated by a motor, moving the gripper in an opposite direction of an other cable of the pair also in a flexible sheath, providing equal motions of each cable in the pair in opposite directions, such that the pairs of cables operating the at least one gripper are directed around a joint between segments via helical pulleys, the helical pulleys include a groove structure that is u-shaped grooves; and
   a motor assembly including at least one motor is mounted at a location separate from the assembly with the flexible sheaths extending between the assemblies, such that a separate assembly mounting arrangement provides for maintaining a ratio between an applied force of the at least one gripper against an object to an overall mass of the assembly, resulting in improving an overall performance of the robot gripper, wherein at least one cable of the pair of cables passes through a low friction cable retainer of a jib arm, wherein the jib arm is hinged to rotate left and right horizontally, as well as rise up and down vertically.

15. A robot end effector, comprising:
   at least two grippers of a grasper assembly configured to perform grasping motions via actuation of independent cable ends of a plurality of cables, and configured to move toward or away from each other to perform the grasping motion, wherein each gripper is actuated by a pair of cables in flexible sheathing connected to a motor, moving the gripper in an opposite direction of an other cable of the pair, providing equal motions of each cable in the pair in opposite directions, such that the pairs of cables operating each gripper are directed around a joint between segments via helical pulleys;

a motor assembly including the motors is mounted at a location separate from the grasper assembly with the flexible sheathing extending between the assemblies, such that a separate assembly mounting arrangement provides for maintaining a ratio between a gripping force of the grippers to an overall mass of the grasper assembly, resulting in improving an overall performance of the robot end effector, wherein at least one cable of the pair of cables passes through a low friction cable retainer of a jib arm, wherein the jib arm is hinged to rotate left and right horizontally, as well as rise up and down vertically.

16. The robot end effector of claim 15, wherein at least one gripper includes multiple segments comprising a finger like configuration, such that joints between the segments allows relative motion between the segments of the finger like configuration, and that the pairs of cables operating each gripper are directed around a joint between segments of the gripper via helical pulleys, such that the opposing cables in each cable pair wrap in opposite directions around a single helical pulley having u-shaped grooves, with a wrap angle greater than 180 degrees.

17. A robotic prehension device, comprising:
at least two claws of a gripper assembly configured to perform gripping motions via actuation of independent cable ends of a plurality of cables, and configured to move toward or away from each other to perform the gripping motion, wherein each claw is actuated by a pair of cables in flexible sheathing connected to a motor, the flexible sheathing is rotatably and slidably extending over each cable and capable of withstanding forces, such that the pairs of cables operating each claw are directed around a joint between segments of each claw via helical pulleys, and the opposing cables in each cable pair wrap in opposite directions around a single helical pulley, with a wrap angle greater than 180 degrees;

a motor assembly including the motors is mounted at a location separate from the gripper assembly with the flexible sheathing extending between the assemblies, such that a separate assembly mounting arrangement provides for maintaining a ratio between a gripping force of the claws to an overall mass of the gripper assembly, resulting in improving an overall performance of the robot prehension device, wherein at least one cable of the pair of cables passes through a low friction cable retainer of a jib arm, wherein the jib arm is hinged to rotate left and right horizontally, as well as rise up and down vertically.

18. The robotic prehension device of claim 17, wherein the helical pulleys include u-shaped grooves, such that a groove structure of each u-shaped groove is a matched-profiled groove structure of the cable in the pair of cables.

* * * * *